(12) United States Patent
Fukui

(10) Patent No.: US 10,070,052 B2
(45) Date of Patent: Sep. 4, 2018

(54) IMAGE CAPTURING APPARATUS, IMAGE PROCESSING APPARATUS, AND CONTROL METHODS THEREOF

(71) Applicant: CANON KABUSHIKI KAISHA, Tokyo (JP)

(72) Inventor: Takaaki Fukui, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/635,905

(22) Filed: Jun. 28, 2017

(65) Prior Publication Data

US 2018/0007260 A1 Jan. 4, 2018

(30) Foreign Application Priority Data

Jun. 29, 2016 (JP) ................. 2016-129132

(51) Int. Cl.
*H04N 5/232* (2006.01)
*G06K 9/62* (2006.01)
*H04N 9/07* (2006.01)
*G06F 3/0484* (2013.01)

(52) U.S. Cl.
CPC ....... *H04N 5/23222* (2013.01); *G06K 9/6215* (2013.01); *H04N 5/23216* (2013.01); *H04N 5/23293* (2013.01); *H04N 9/07* (2013.01); *G06F 3/04842* (2013.01)

(58) Field of Classification Search
CPC .............. G06F 3/04842; G06K 9/6215; H04N 5/23216; H04N 5/23222; H04N 5/23293; H04N 9/07
See application file for complete search history.

(56) References Cited

U.S. PATENT DOCUMENTS 7,995,116 B2 * 8/2011 Pillman ................. H04N 5/232
348/229.1
2007/0248330 A1 * 10/2007 Pillman ................. H04N 5/232
386/224
2010/0309332 A1 * 12/2010 Ueda ................. H04N 5/23293
348/229.1

(Continued)

FOREIGN PATENT DOCUMENTS

JP 2003274268 A * 9/2003
JP 3948652 B2 7/2007

*Primary Examiner* — Amy Hsu
(74) *Attorney, Agent, or Firm* — Carter, DeLuca, Farrell & Schmidt LLP

(57) ABSTRACT

An image capturing apparatus provided with an image capturing unit that captures a first image, a scene discrimination unit that discriminates a scene of an object a candidate generation unit that generates a shooting setting candidate, based on a result of the discrimination, an image generation unit that generates, based on the shooting setting candidate, an image reflecting an effect obtained by the shooting setting candidate, and a display device. The candidate generation unit performs at least one of a first operation for generating a plurality of shooting setting candidates in which a predetermined parameter is separated by greater than a threshold value and a second operation for generating at least one shooting setting candidate based on the result of the discrimination, and the display device preferentially displays the shooting setting candidates generated by the first operation.

19 Claims, 23 Drawing Sheets

(56) References Cited

U.S. PATENT DOCUMENTS

| | | | | |
|---|---|---|---|---|
| 2011/0293259 A1* | 12/2011 | Doepke | ............. | G03B 7/08 |
| | | | | 396/236 |
| 2014/0085507 A1* | 3/2014 | Pillman | ............. | G06T 5/004 |
| | | | | 348/231.99 |
| 2014/0347513 A1* | 11/2014 | Kobayashi | ......... | H04N 5/23229 |
| | | | | 348/222.1 |
| 2015/0341535 A1* | 11/2015 | Forutanpour | ...... | H04N 5/23293 |
| | | | | 348/222.1 |
| 2015/0358527 A1* | 12/2015 | Niida | ............. | G03B 11/00 |
| | | | | 348/211.3 |

* cited by examiner

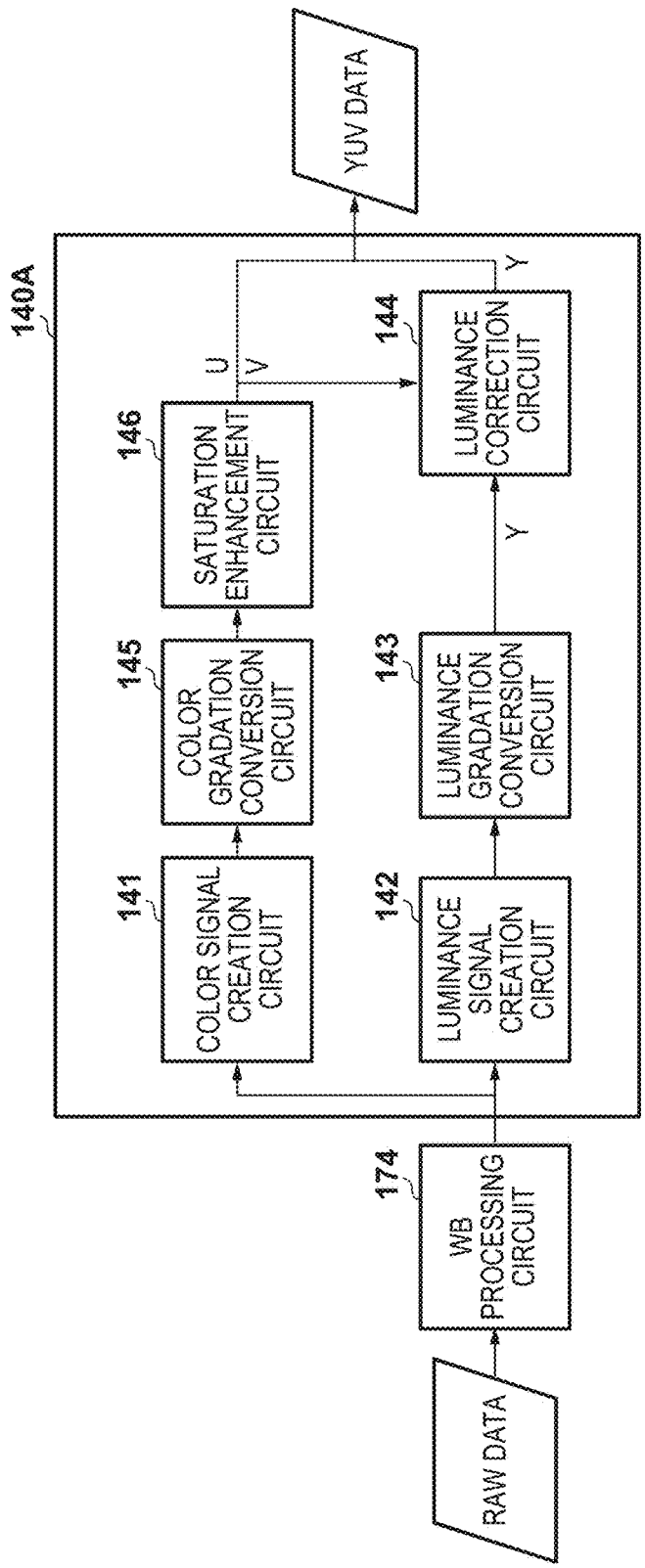

FIG. 3

| SETTING ITEM | | SETTING VALUES | | | | |
|---|---|---|---|---|---|---|
| BRIGHTNESS | EXPOSURE CORRECTION VALUE | -9~+9 | | | | |
| OBJECT BLUR | SHUTTER SPEED | -6~+6 | | | | |
| BACKGROUND BOKEH | F-VALUE SETTING | F2.8 | F4.0 | F5.6 | F8.0 | F11.0 |
| COLORATION SETTING | WHITE BALANCE SETTING | AUTO | SUNNY | SHADY | CLOUDY | ARTIFICIAL LIGHTING |
| COLORATION CORRECTION (A-B) | WHITE BALANCE CORRECTION (A-B) | -9~+9 | | | | |
| COLORATION CORRECTION (G-Mg) | WHITE BALANCE CORRECTION (G-Mg) | -9~+9 | | | | |
| FINISHING SETTING | IMAGE QUALITY SETTING | STANDARD | LANDSCAPE | PORTRAIT | NEUTRAL | FAITHFUL |
| | MONOCHROME SETTING | B/W | PINK | SEPIA | BLUE | PURPLE |
| CRISPNESS | CONTRAST VALUE | -4~+4 | | | | |
| VIVIDNESS | SATURATION SETTING | -4~+4 | | | | |

ANALYZE SCENE

SELECT CANDIDATE 1

INSTRUCT SHOOTING

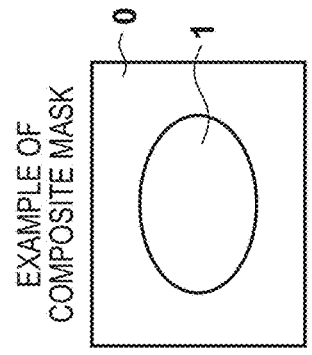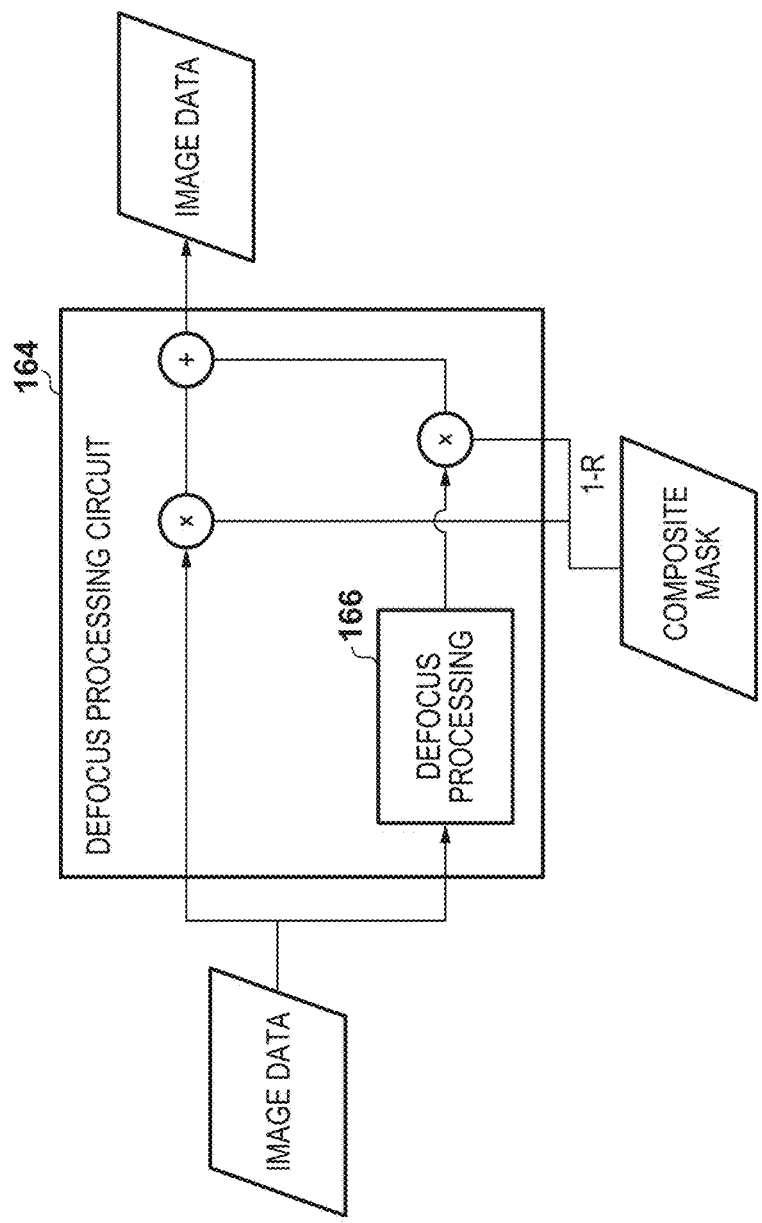

F I G. 12

| ITEM | SCENE DETERMINATION CONTENTS | DETERMINATION METHOD |
|---|---|---|
| MAIN OBJECT DETERMINATION | PORTRAIT | FACE DETECTION |
| | MAIN OBJECT MOTION | MOTION VECTOR DETERMINATION |
| | LANDSCAPE | OBJECT LUMINANCE/ IN-PLANE COLOR DISTRIBUTION |
| | MACRO | OBJECT DISTANCE |
| BACKGROUND DETERMINATION | DYNAMIC RANGE | IN-PLANE COLOR DISTRIBUTION |
| | BACKLIGHT | IN-PLANE COLOR DISTRIBUTION |
| | BRIGHTNESS (OUTDOORS/INDOORS) | OBJECT LUMINANCE |
| | BLUE SKY | OBJECT LUMINANCE/ IN-PLANE COLOR DISTRIBUTION |
| | NIGHT VIEW | OBJECT LUMINANCE/CONTRAST |
| | EVENING VIEW | OBJECT LUMINANCE/ IN-PLANE COLOR DISTRIBUTION |
| | SPOTLIGHT | IN-PLANE LUMINANCE DISTRIBUTION |
| | BACKGROUND DISTANCE | ON-SCREEN DISTANCE INFORMATION |
| COLOR TONE DETERMINATION | YELLOW | IN-PLANE COLOR DISTRIBUTION |
| | BLUE | IN-PLANE COLOR DISTRIBUTION |
| | RED | IN-PLANE COLOR DISTRIBUTION |
| | GREEN | IN-PLANE COLOR DISTRIBUTION |
| CAMERA STATE | TRIPOD DETERMINATION | ANGULAR VELOCITY SENSOR, MOTION VECTOR DETERMINATION |

F I G. 14

|  | LUMINANCE | | HUE | | SATURATION | | SCREEN RATE L | SCREEN RATE H |
|---|---|---|---|---|---|---|---|---|
|  | Y_Lo | Y_Hi | Hue_Lo | Hue_Hi | Chroma_Lo | Chroma_Hi | | |
| SKIN COLOR | 110 | 235 | 120 | 145 | 10 | 30 | 20% | 40% |
| ORANGE | 30 | 235 | 115 | 155 | 45 | 150 | 15% | 40% |
| RED | 65 | 235 | 70 | 130 | 25 | 150 | 10% | 20% |
| YELLOW | 170 | 245 | 155 | 175 | 30 | 150 | 10% | 40% |
| BLUE | 30 | 240 | 310 | 345 | 10 | 150 | 10% | 40% |
| GREEN | 30 | 150 | 175 | 250 | 15 | 100 | 30% | 50% |
| WHITE | 200 | 256 | 0 | 360 | 0 | 7 | 10% | 20% |
| GRAY | 45 | 180 | 0 | 360 | 0 | 4 | 30% | 60% |
| BLACK | 0 | 45 | 0 | 360 | 0 | 4 | 30% | 60% |
| SKY BLUE | 60 | 250 | 310 | 330 | 20 | 65 | 10% | 40% |
| HIGH LUMINANCE GREEN | 190 | 255 | 160 | 300 | 10 | 100 | 10% | 20% |

| NUMBER OF BLUE/GREEN BLOCKS | Bv UPPER LIMIT | Bv LOWER LIMIT |
|---|---|---|
| ≥ 20% | 1 | 3 |
| < 20% | 3 | 5 |

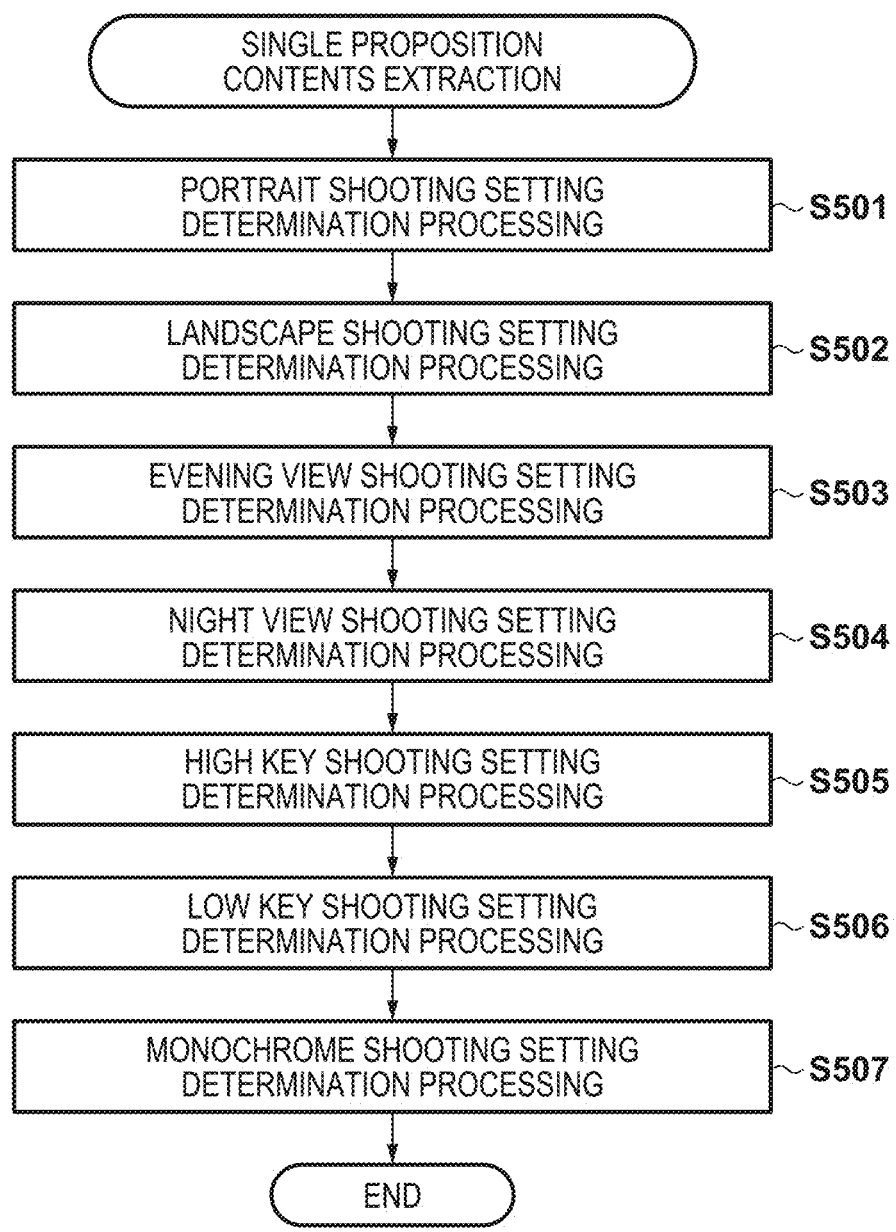

FIG. 17A

| | DETERMINATION CONDITIONS | | | SCENE DETERMI-NATION LEVEL | EFFECT | | | | | |
|---|---|---|---|---|---|---|---|---|---|---|
| | Bv | YELLOW BLOCK | MACRO DETERMINATION | SCENE DETERMI-NATION | | EXPO-SURE | CONTRAST | SATURA-TION | COLORA-TION SETTING | COLORATION CORRECTION (A-B) | COLORATION CORRECTION (G-Mg) |
| YELLOW | <6 | | | × | — | — | — | — | — | — | — |
| | ≥6 | ≥40% | ○ | ○ | 50 | 3 | 0 | 0 | SHADY | 7 | 0 |
| | | ≥20% | — | ○ | 40 | 3 | 3 | 2 | SUNNY | 9 | 0 |
| | | <20% | ○ | ○ | 30 | -1 | 3 | 0 | SHADY | 7 | 4 |

| | DETERMINATION CONDITIONS | | | SCENE DETERMI-NATION LEVEL | EFFECT | | | | | |
|---|---|---|---|---|---|---|---|---|---|---|
| | Bv | BLUE BLOCK | BACKLIGHT DETERMINATION | SCENE DETERMI-NATION | | EXPO-SURE | CONTRAST | SATURA-TION | COLORA-TION SETTING | COLORATION CORRECTION (A-B) | COLORATION CORRECTION (G-Mg) |
| BLUE | ≥3, <6 | ≥20% | ○ | × | — | — | — | — | — | — | — |
| | ≥6 | ≥20% | ○ | ○ | 50 | -6 | 0 | 0 | AUTO | 0 | 0 |
| | | ≥20% | × | ○ | 40 | 2 | 0 | 3 | AUTO | 0 | 0 |
| | | 10%~20% | — | ○ | 30 | -2 | 0 | -2 | AUTO | -5 | 0 |
| | | ≤10% | — | × | — | — | — | — | — | — | — |

FIG. 17B

| | DETERMINATION CONDITIONS | | | | SCENE DETERMINATION LEVEL | EFFECT | | | | |
|---|---|---|---|---|---|---|---|---|---|---|
| | Bv | RED/BLUE BLOCK RATIO | EVENING VIEW DETERMINATION | SCENE DETERMINATION | | EXPOSURE | CONTRAST | SATURATION | COLORATION SETTING | COLORATION CORRECTION (A-B) | COLORATION CORRECTION (G-Mg) |
| MAGENTA | ≥3, <10 | RED > BLUE | ○ | ○ | 50 | -2 | 0 | 2 | AUTO | 2 | 9 |
| | | RED < BLUE | ○ | ○ | 40 | -3 | 0 | 2 | SHADY | 0 | 9 |

| | DETERMINATION CONDITIONS | | | SCENE DETERMINATION LEVEL | EFFECT | | | | |
|---|---|---|---|---|---|---|---|---|---|---|
| | Bv | GREEN BLOCK RATIO | ACHROMATIC BLOCK | SCENE DETERMINATION | | EXPOSURE | CONTRAST | SATURATION | COLORATION SETTING | COLORATION CORRECTION (A-B) | COLORATION CORRECTION (G-Mg) |
| GREEN | ≥5 | ≤30% | ≥30% | ○ | 50 | 5 | -4 | -4 | AUTO | 0 | -9 |
| | ≥5 | ≥30% | ≤20% | ○ | 40 | -3 | 0 | 2 | SHADY | 0 | 9 |
| | 0~3 | ≥60% | | ○ | 30 | 0 | 0 | 3 | SUNNY | 0 | 4 |
| | 3~6 | ≥60% | | ○ | 30 | -2 | 0 | 3 | AUTO | -5 | 5 |

FIG. 18

| DETERMINATION CLASSIFICATION | PROPOSITION TYPE | PROCESSING OUTLINE |
|---|---|---|
| PORTRAIT | PAIR | PROCESSING FOR DEFOCUSING BACKGROUND AND SHOOTING CRISP BACKGROUND |
| BACKLIGHT | PAIR | EXPOSURE FAVORING MAIN OBJECT, EXPOSURE FAVORING BACKGROUND |
| MACRO | PAIR | PROCESSING FOR DEFOCUSING BACKGROUND AND SHOOTING CRISP BACKGROUND |
| PORTRAIT | SINGLE | BRIGHT FACE, GOOD SKIN COLOR |
| LANDSCAPE | SINGLE | HIGH SATURATION, REDUCED HALATION |
| EVENING VIEW | SINGLE | ENHANCED EVENING VIEW SATURATION, REDUCED EXPOSURE |
| NIGHT VIEW | SINGLE | EXPOSURE ENHANCING SHADOW LINES |
| HIGH KEY | SINGLE | INCREASED EXPOSURE, LOW SATURATION/CONTRAST |
| LOW KEY | SINGLE | REDUCED EXPOSURE, HIGH SATURATION/CONTRAST |
| MONOCHROME | SINGLE | MONOCHROME SHOOTING |
| COLOR EFFECT GREEN | COLOR EFFECT | GREEN FILTER-LIKE SHOOTING |
| COLOR EFFECT YELLOW | COLOR EFFECT | YELLOW FILTER-LIKE SHOOTING, INCREASED EXPOSURE |
| COLOR EFFECT BLUE | COLOR EFFECT | BLUE FILTER-LIKE SHOOTING |
| COLOR EFFECT RED | COLOR EFFECT | RED FILTER-LIKE SHOOTING, REDUCED EXPOSURE |

IMAGE CAPTURING APPARATUS, IMAGE PROCESSING APPARATUS, AND CONTROL METHODS THEREOF

BACKGROUND OF THE INVENTION

Field of the Invention

The present invention relates to an apparatus that analyzes a shooting scene and presents a user with a plurality of shooting settings according to a result of the analysis.

Description of the Related Art

With a conventional image capturing apparatus, the user obtains a desired image quality by shooting after setting exposure values such as shutter speed and aperture and image quality control values such as white balance (hereinafter, WB) control and color parameters to desired values.

Also, recent digital cameras have been proposed that include functions for users inexperienced in handling a camera, such as an auto scene function that analyzes a scene and then presents an optimal shooting mode or automatically sets color parameters and an exposure correction value, according to the analysis result. Such a camera is described in Japanese Patent No. 3948652, for example.

However, with cameras prior to auto scene functions such as the above being proposed, there was a problem in that, in order to shoot preferable images, specialist knowledge about the shooting functions of the camera was essential, making it difficult for a general user to obtain the images he or she wants.

Also, with a camera equipped with an auto scene function, there was a problem in that since the camera sets an optimal state that depends on the scene, it is difficult to comprehend what camera settings were configured to obtain the final image, making it difficult for the user to learn the functions of the camera. Such problems occurred not only at the time of shooting but also in the case of trying to edit images that have been shot.

SUMMARY OF THE INVENTION

The present invention was made in view of the above-mentioned problems, and provides an apparatus that is able to intelligibly display to a user the relationship between appropriate parameter settings for a scene that is going to be taken or an image that is going to be edited and an image that will be obtained with those settings.

According to a first aspect of the present invention, there is provided an image capturing apparatus comprising: at least one non-transitory memory device; at least one processor; a camera device that includes a taking lens and an image sensor and captures a first image, based on a first shooting setting; a scene discrimination unit that discriminates a scene of an object, based on the first shooting setting and a feature amount of the first image; a candidate generation unit that generates a shooting setting candidate, based on a result of the discrimination by the scene discrimination unit; an image generation unit that generates, based on the shooting setting candidate generated by the candidate generation unit, an image reflecting an effect obtained by the shooting setting candidate; and a display control unit that causes a display device to display the image generated by the image generation unit, wherein the candidate generation unit performs at least one of a first operation for generating a plurality of shooting setting candidates in which a predetermined parameter is separated by greater than or equal to a threshold value out of the shooting settings based on a result of the discrimination by the scene discrimination unit and a second operation for generating at least one shooting setting candidate based on the result of the discrimination by the scene discrimination unit, and the display control unit causes the display device to preferentially display the shooting setting candidates generated by the first operation, and wherein the scene discrimination unit, the candidate generation unit, the image generation unit and the display control unit are implemented by the at least one processor executing at least one program recorded on the at least one non-transitory memory device.

According to a second aspect of the present invention, there is provided an image processing apparatus comprising: at least one non-transitory memory device; at least one processor; a scene discrimination unit that discriminates a scene of an object, based on a feature amount of a first image; a candidate generation unit that generates a setting candidate relating to at least one of a shooting parameter and an image processing parameter, based on a result of the discrimination by the scene discrimination unit; an image generation unit that generates, based on the setting candidate generated by the candidate generation unit, an image reflecting an effect obtained by the setting candidate; and a display control unit that causes a display device to display the image generated by the image generation unit, wherein the candidate generation unit performs at least one of a first operation for generating a plurality of setting candidates in which a predetermined parameter is separated by greater than or equal to a threshold value out of the settings based on a result of the discrimination by the scene discrimination unit and a second operation for generating at least one setting candidate based on the result of the discrimination by the scene discrimination unit, and the display control unit causes the display device to preferentially display the setting candidates generated by the first operation, and wherein the scene discrimination unit, the candidate generation unit, the image generation unit and the display control unit are implemented by the at least one processor executing at least one program recorded on the at least one non-transitory.

According to a third aspect of the present invention, there is provided a method of controlling an image capturing apparatus that includes an image capturing unit that captures a first image based on a first shooting setting, the method comprising: discriminating a scene of an object, based on the first shooting setting and a feature amount of the first image; generating a shooting setting candidate, based on a result of the discrimination in the scene discrimination; generating, based on the shooting setting candidate generated in the candidate generation, an image reflecting an effect obtained by the shooting setting candidate; and displaying the image generated in the image generation, wherein, in the candidate generation, at least one of a first operation for generating a plurality of shooting setting candidates in which a predetermined parameter is separated by greater than or equal to a threshold value out of the shooting settings based on a result of the discrimination in the scene discrimination and a second operation for generating at least one shooting setting candidate based on the result of the discrimination in the scene discrimination is performed, and in the display, the shooting setting candidates generated by the first operation are preferentially displayed.

According to a fourth aspect of the present invention, there is provided a control method for an image processing apparatus, the method comprising: discriminating a scene of an object, based on a feature amount of a first image;

generating a setting candidate relating to at least one of a shooting parameter and an image processing parameter, based on a result of the discrimination in the scene discrimination; generating, based on the setting candidate generated in the candidate generation, an image reflecting an effect obtained by the setting candidate; and displaying the image generated in the image generation, wherein, in the candidate generation, at least one of a first operation for generating a plurality of setting candidates in which a predetermined parameter is separated by greater than or equal to a threshold value out of the settings based on a result of the discrimination in the scene discrimination and a second operation for generating at least one setting candidate based on the result of the discrimination in the scene discrimination is performed, and in the display, the setting candidates generated by the first operation is preferentially displayed.

Further features of the present invention will become apparent from the following description of exemplary embodiments with reference to the attached drawings.

BRIEF DESCRIPTION OF THE DRAWINGS

FIG. 2B is a block diagram showing signal processing in one embodiment.

FIG. 3 is a diagram showing exemplary settings of a camera shooting function.

FIGS. 11A and 11B are block diagrams showing defocus processing.

FIG. 12 is a diagram showing an example of performing scene discrimination.

FIG. 14 is a diagram showing detection settings for respective block colors.

FIG. 16C is a flowchart showing shooting setting proposition processing.

FIGS. 17A and 17B are diagrams showing detection/shooting settings for color processing effect.

FIG. 18 is a diagram showing an example of shooting proposition contents.

DESCRIPTION OF THE EMBODIMENTS

Hereinafter, one embodiment of the present invention will be described in detail with reference to the accompanying drawings.

Figure 1:
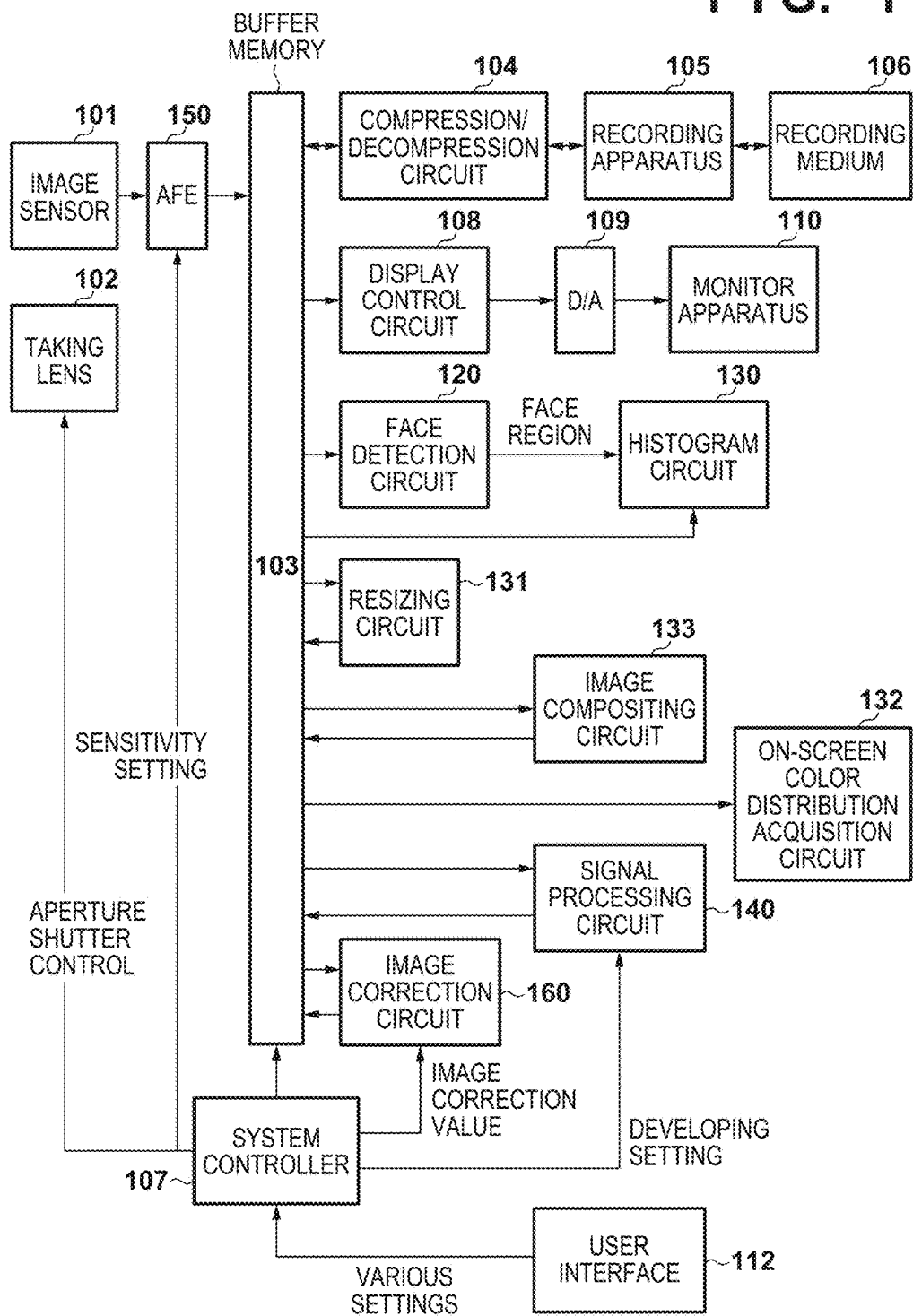
FIG. 1 is a block diagram showing the configuration of an image capturing apparatus according to one embodiment of the present invention.

FIG. 1 is a block diagram showing the configuration of an image capturing apparatus according to one embodiment of the present invention. In FIG. 1, the image capturing apparatus performs a shooting operation when a shooting instruction is input by a user via a user interface (hereinafter, UI) 112. Specifically, a system controller 107 adjusts the focal position of a taking lens 102 and controls an image sensor 101 consisting of a diaphragm, a mechanical shutter, a CMOS sensor and the like to perform shooting. When shooting is performed, an analog image signal is output from the image sensor 101, undergoes gain adjustment by an AFE circuit (analog front end) 150, and is converted into a digital signal. The digital image signal output from the AFE circuit 150 is stored in a buffer memory 103. Thereinafter, signal processing parameters such as a white balance correction coefficient and a gamma parameter are set in a signal processing circuit 140, under the control of the system controller 107. The signal processing circuit 140 performs signal processing for image generation on the image signal read out from the buffer memory 103, and YUV image data is generated.

The generated YUV image data is, in the case where image recording is performed, sent to a compression/decompression circuit 104 to undergo compression processing into a JPEG file, and is recorded to a recording medium 106 by a recording apparatus 105. In the case of resizing, size conversion processing is performed by a resizing circuit 131. Also, in the case of displaying an image, the YUV image data stored in the buffer memory 103 is converted into a signal suitable for display by a display control circuit 108. The signal output from the display control circuit 108 is converted into an analog signal by a D/A converter 109, and the resultant image is displayed on a monitor apparatus 110.

Also, in the case of performing camera control using the UI 112 such as configuring camera shooting settings, the system controller 107 generates a user interface screen. The generated user interface screen is stored in the buffer memory 103, and is displayed on the monitor apparatus 110 via the display control circuit 108. The display control circuit 108 is also capable of redundantly displaying YUV image data and a user interface screen. In that case, redundant processing of an image is performed by an image compositing circuit 133.

Also, in the case of detecting a face from a shot image, a face detection circuit 120 detects a face from the YUV image data stored in the buffer memory 103, and outputs the coordinates of the face in the image. Also, with respect to the region in which the face is detected, image information such as the brightness of the face region can be acquired, by acquiring a histogram of luminance values using a histogram circuit 130. Also, in the case of dividing the screen into a plurality of regions and acquiring a histogram for each region, the YUV image data is read out from the buffer memory 103, and the on-screen color distribution is acquired by an on-screen color distribution acquisition circuit 132. In that case, the screen can be divided into a plurality of regions, an integrated value of YUV can be acquired for each divided region, and image data such as saturation, hue and luminance can be acquired from that data. The on-screen histogram is acquirable by analyzing YUV image data with the histogram circuit 130. In the case of correcting the signal processed YUV image data, an image correction circuit 160 performs correction processing.

Figure 2A:
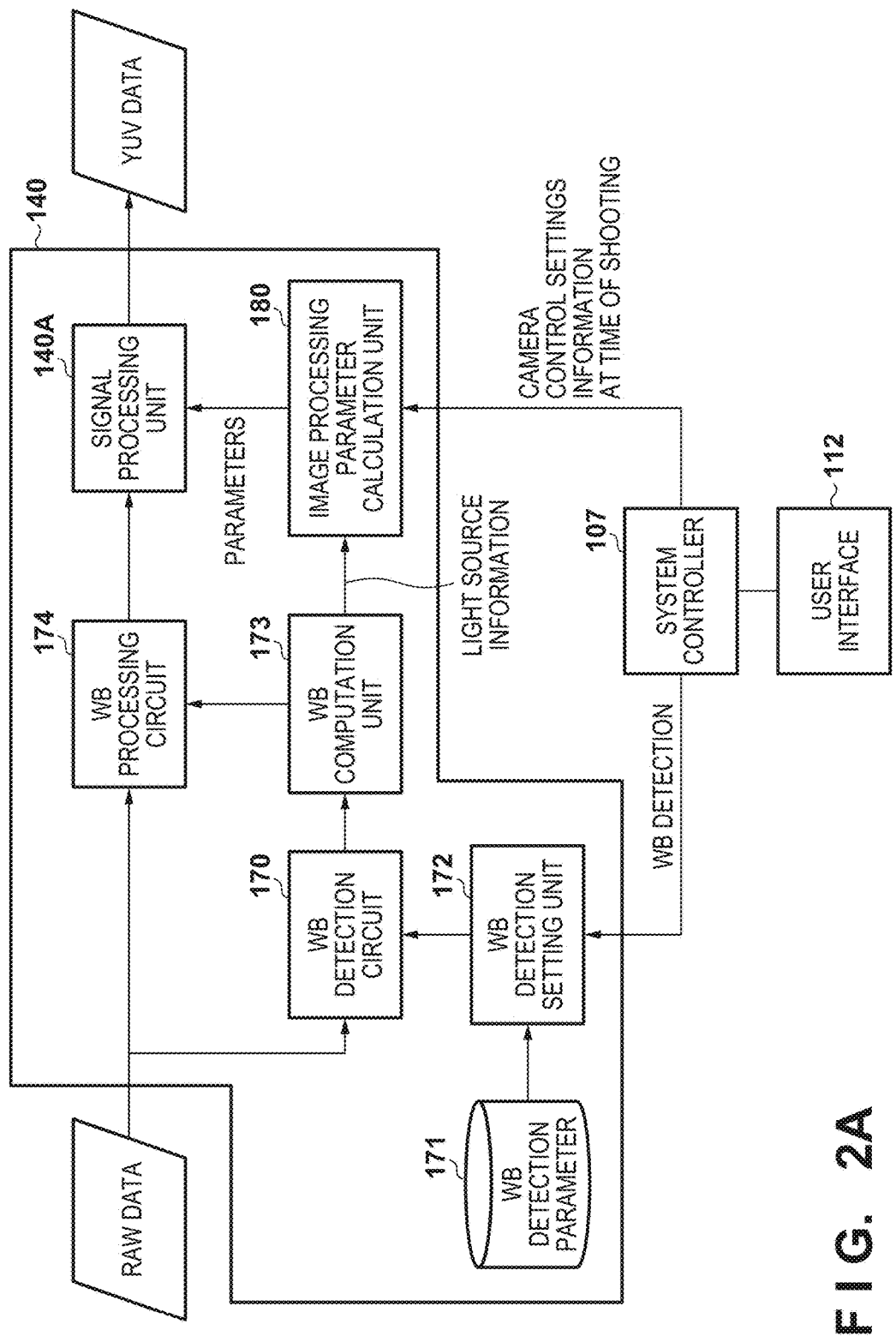
FIG. 2A is a block diagram showing signal processing in one embodiment.

Next, FIG. 2A is a block diagram showing the flow of image processing for generating YUV image data from RAW data obtained with the image sensor 101. When image data is acquired, a WB (white balance) detection setting circuit 172 within the signal processing circuit 140 calculates a WB detection setting value using a WB detection parameter 171, according to the WB mode of the shot image and shooting conditions such as object luminance (Bv value) and shooting sensitivity. The WB detection setting value is set in a WB detection circuit 170. In the WB detection circuit 170, extraction of a white region is performed on the acquired RAW data, based on the set WB detection value. A WB computation circuit 173 calculates a WB coefficient using the detection result from the WB detection circuit 170. WB processing is performed on RAW data by a WB processing circuit 174, using the calculated WB coefficient. On the other hand, color temperature that depends on the detected WB coefficient can be obtained, by calculating the relationship between WB coefficient and color temperature in advance. An image processing parameter calculation circuit 180 calculates an image processing parameter according to detected color temperature, color conversion parameter, shooting ISO speed, aperture value and the like. Also, in a signal processing circuit 140A, various processing such as noise reduction, edge enhancement, color reproduction conversion, and gradation conversion is performed, and YUV image data is generated.

FIG. 2B is a block diagram showing the flow of processing in the signal processing circuit 140A. RAW data output from the image sensor 101 and converted into a digital signal is subject to white gain adjustment by the WB processing circuit 174 and, in a color signal creation circuit 141, undergoes processing such as color conversion matrix processing and gradation conversion processing for each color temperature and a color difference signal is created. The color difference signal obtained through conversion performed by the color signal creation circuit 141 is subject to RGB conversion, and undergoes color gradation conversion by a color gradation conversion circuit 145. The RGB signal that has undergone color gradation conversion is again converted into a color difference signal, and is subject to saturation adjustment by a saturation enhancement circuit 146.

Meanwhile, the signal from the WB processing circuit 174 undergoes interpolation processing, edge enhancement processing and noise reduction processing that depend on ISO speed, shooting parameters, aperture value and the like by a luminance signal creation circuit 142 and a luminance signal is created. Thereinafter, the luminance signal undergoes gradation conversion by a luminance gradation conversion circuit 143 and correction by a luminance correction circuit 144 according to the hue of the luminance signal, and is output as a luminance signal.

FIG. 3 is a diagram showing an example of camera shooting settings. An example is shown in which nine types of settings, namely, brightness, motion blur, background bokeh, coloration setting, coloration correction (amber-blue), coloration correction (green-magenta), crispness, vividness and finishing correction, for example, are given as settable items. Shooting control values and signal processing parameters are set, according to these camera settings.

In FIG. 3, brightness correction sets an exposure correction value with respect to an exposure control value determined by AE (auto exposure control). The control value is changed according to the set correction value, based on a program diagram. In the present embodiment, an example is shown in which the correction value can be set over ±9 steps from −3 to +3 in ⅓ stop increments.

A background bokeh setting represents setting of the aperture value at the time of shooting, with depth of field becoming shallower and background bokeh becoming greater as the aperture is opened up. This function changes the ISO speed value and the aperture setting according to the shutter speed setting to change background bokeh while maintaining brightness. An example is shown in which the shutter speed setting is settable over ±6 steps from −2 to +2 in ⅓ stop increments, with the number of stops indicating the difference from the shutter speed at the correct exposure. −6 refers to a setting for shooting with a shutter speed 2 stops slower than normal.

The coloration setting refers to a basic white balance setting. Auto represents an automatic white balance setting, and involves analyzing an image and configuring an optimal white balance setting for the image. The white balance setting other than auto is a WB setting adjusted for individual light sources, and is a setting configured by calculating WB setting values (white balance setting values) in advance according to the respective light sources.

Coloration correction (G–Mg) and coloration correction (A–B) are functions that finely adjust the white balance setting, by adding a correction value to the WB setting value determined by the coloration setting. Here, the respective WB processing is represented by the following equations, where R, G1, G2 and B are the sensor output values of a gray object that are based on the color filter array of the image sensor, and WB_R, WB_G1, WB_G2 and WB_B are the WB coefficients corresponding to the respective colors.

$$G1'=G1 \times WB\_G1$$

$$R'=R \times WB\_R$$

$$B'=B \times WB\_B$$

$$G2'=G1 \times WB\_G1$$

Here, white balance will have been set appropriately when R', G1', G2' and B' take the same values.

Also, the WB evaluation values are represented as follows, where Cx and Cy are the WB evaluation values with respect to the WB coefficients.

$$Cx=(R-B)/Y \times 1024$$

$$Cy=\{R+B-(G1+G2)\}/Y \times 1024$$

$$Y=(R+G1+G2+B)/4$$

Here, the values of Cx and Cy are calculable from the WB coefficients WB_R, WB_G1, WB_G2 and WB_B, and, conversely, the WB coefficients can be calculated from Cx and Cy, by assuming that the average value of the WB coefficients is 1024. Also, WB correction can be performed using the values of Cx and Cy, by correcting the values of Cx and Cy as follows, where ΔCx and ΔCy are the WB correction values with respect to Cx and Cy, a is the WB correction setting value (A–B), and β is the WB correction setting value (G–Mg).

$$Cx'=Cx+\alpha \times \Delta Cx$$

$$Cy'=Cy+\beta \times \Delta Cy$$

In the present embodiment, α and β are described as being settable over ±9 steps.

The finishing setting represents a standard image quality setting that depends on the scenes of each camera, and, in the present embodiment, five types of settings, namely, Standard, Landscape, Portrait, Neutral and Faithful, are available. With these settings, parameters are set such that the settings of the color signal creation circuit 141, the color gradation conversion circuit 145, the saturation enhancement circuit 146, the luminance gradation conversion circuit 143 and the luminance correction circuit 144 are optimized for each setting, according to the respective scenes.

Generally, in Standard, vividness and contrast are set slightly high to create a striking picture, and, in Landscape shooting, contrast and vividness are set higher than in Standard. Also, in Portrait, skin color is set slightly brighter and saturation is set lower than in Standard to give a soft luminance gradation in brighter regions. In Neutral, saturation and contrast are set lower than in Standard, and, in Faithful, parameters are set so that the actual color tone of the object can be faithfully realized.

Figure 4:
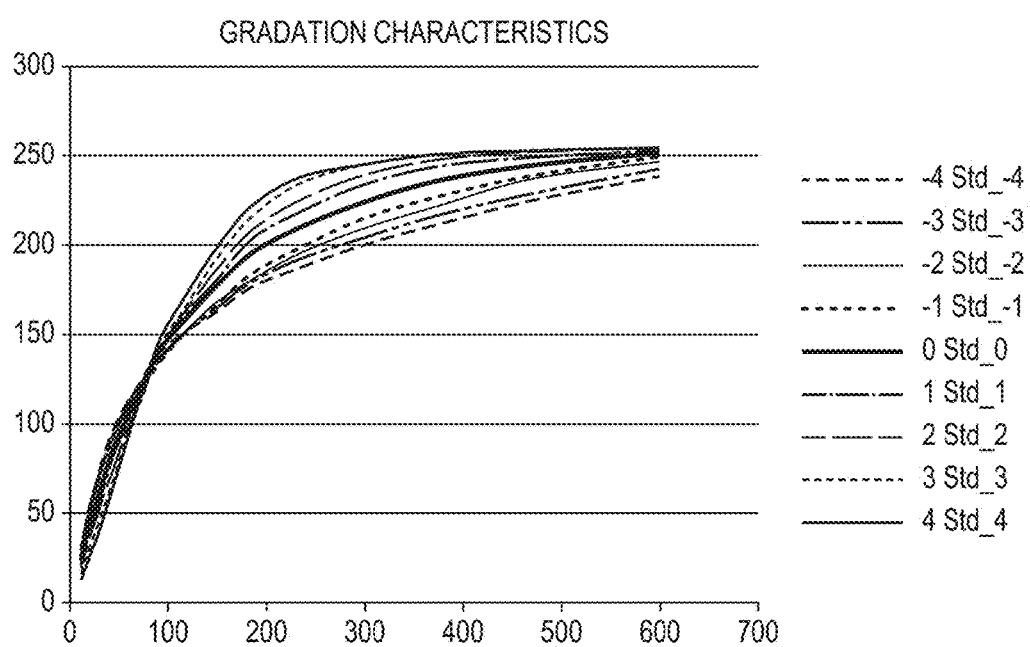
FIG. 4 is a diagram showing an example of gradation correction settings.

Crispness can be adjusted by changing the gamma characteristics that are set with the luminance gradation conversion circuit 143. FIG. 4 shows the gradation characteristics that are set by the luminance gradation conversion circuit 143, with the gradation characteristics over contrasts from −4 to +4 being shown. The feeling of contrast in the image can be intensified by making the dark regions darker and causing halation to occur early.

The vividness setting is adjusted with the image processing parameters that are set with the saturation enhancement circuit 146 of FIG. 2B, and is represented by the following equations.

$$U'=(1+\text{vividness setting value}\times\Delta\text{Gain})\times U$$

$$V'=(1+\text{vividness setting value}\times\Delta\text{Gain})\times V$$

Here, ΔGain is a parameter that controls the enhancement amount of saturation that depends on the vividness setting, and a vividness setting of 0.6 to 1.4 times the standard saturation setting may be configured when the setting value can be changed from −4 to +4 with ΔGain set to 0.1, for example.

Figure 5:
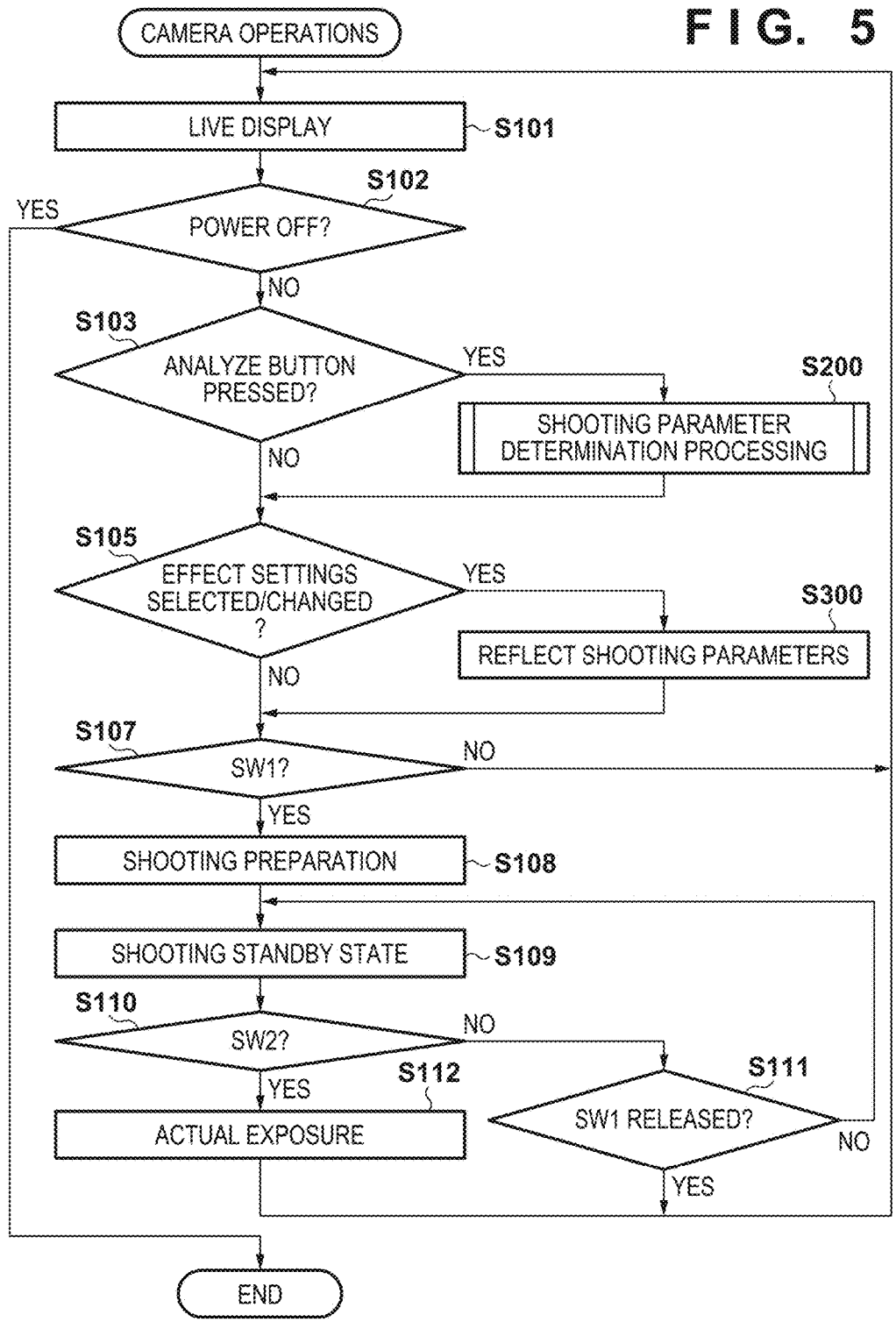
FIG. 5 is a flowchart showing the flow of operations from startup of the image capturing apparatus until shooting.

FIG. 5 is a flowchart showing the flow of operations from startup of the image capturing apparatus until shooting in the present embodiment. In step S101, live view display is performed. In step S102, it is detected whether power is turned OFF, and if power is in an OFF state, the image capturing apparatus is shut down and camera operations are ended. If power is in an ON state, the processing proceeds to step S103. In step S103, it is determined whether an Analyze button has been pressed. If the Analyze button has been pressed, the processing proceeds to step S200, and shooting parameter determination processing which will be discussed later is performed. In the present embodiment, three types of shooting parameters that are determined at step S200 will be described. In step S105, if it is detected that shooting effect settings have been selected or changed, the shooting effect settings are changed, and the processing proceeds to step S300 and processing for reflecting the shooting parameters is performed.

Here, the shooting parameters include shutter speed, aperture value, exposure correction value, ISO speed, contrast, sharpness, saturation, color tone, white balance setting and filter effect. Changing the shutter speed, aperture value and exposure correction value is performed by changing the control parameters of the taking lens 102 and the control of the image sensor 101. Changing the ISO speed is performed by gain control of the AFE 150. Changing the contrast, sharpness, color tone and filter effect is performed by controlling the image processing parameter calculation circuit 180 to change development settings with respect to the signal processing circuit 140A. Changing the white balance setting is performed by controlling the WB computation circuit 173 and changing the operations of the WB processing circuit 174.

In step S107, it is determined whether a switch SW1 that is turned ON by half pressing a release button has been turned ON. If there is a shooting standby instruction resulting from the switch SW1 being turned ON, the processing proceeds to step S108 and shooting preparation is performed. Specifically, light metering by AE (auto exposure control) and focal detection by AF (autofocus) are performed, and actual shooting conditions are determined. Also, in the shooting standby state of step S109, when a switch SW2 is turned ON by the release button being fully pressed (step S110: YES), the processing proceeds to step S112. In step S112, actual shooting is performed under the determined shooting conditions, assuming that actual shooting has been instructed. On the other hand, if, at step S110, the switch SW2 has not been turned ON, the processing proceeds to step S111 and it is determined whether the switch SW1 has been released. If, in step S111, the switch SW1 has not been turned OFF, the processing returns to step S109 and the shooting standby state is continued. Also, if the switch SW1 has been turned OFF and the shooting standby state has been canceled, the processing returns to step S101 and the live view display state is entered.

Figure 6:
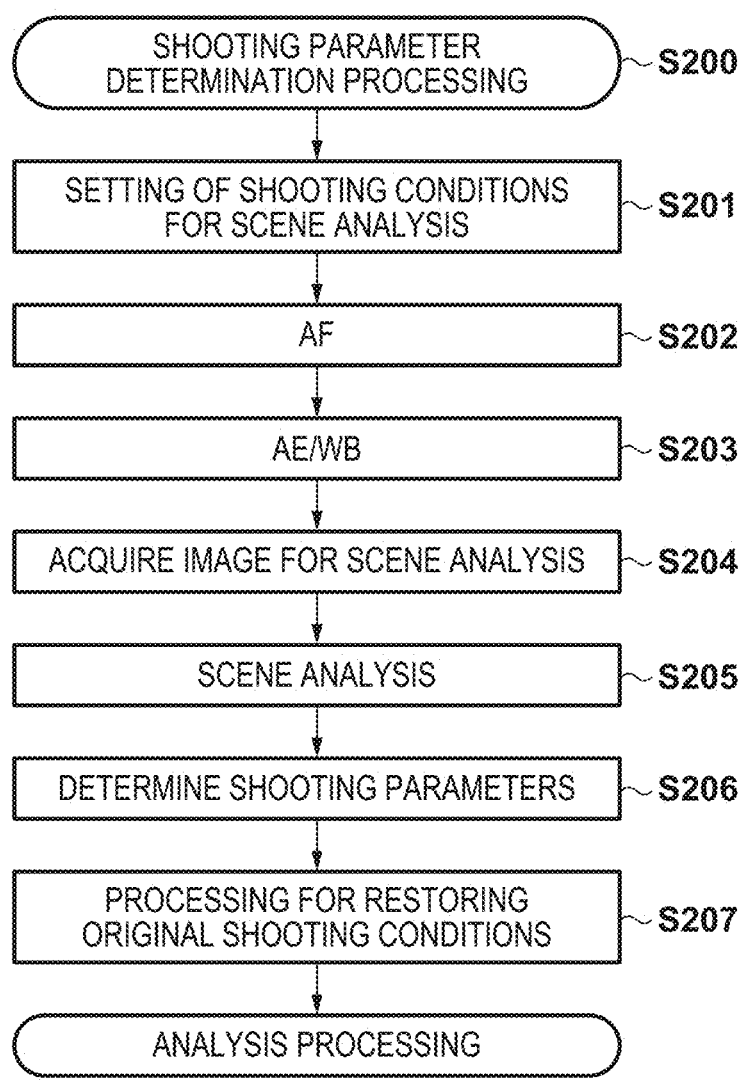
FIG. 6 is a flowchart showing operations of shooting parameter determination processing.

FIG. 6 is a flowchart showing operations of shooting parameter determination processing in step S200 of FIG. 5. When it is determined in step S103 of FIG. 5 that the Analyze button has been pressed, shooting for scene analysis is performed in step S201. Shooting settings for scene analysis are preferably standard settings not based on shooting settings set by the user beforehand. For example, to detect backlight or night view, screen histogram analysis or the like is typically performed, in which case the brightness of the screen being at the correct level is necessary in order to perform scene discrimination correctly. Standard settings are similarly desirable even in the case of analyzing AF or color reproduction.

In step S202, the AF operation is performed and the main object is brought into focus. As the AF (autofocus) technique, focus detection employing a well-known phase difference detection method or the like can be used. At step S203, AE (auto exposure control) is performed and standard brightness is set, and at the same time WB detection and AWB (auto white balance control) processing are performed.

In step S204, an image for scene analysis is shot using the shooting settings set at steps S202 to S203. In step S205, scene analysis is performed. Scene analysis involves analyzing items such as the following, for example. First, it is determined through face detection whether there are any persons. Distance information to the object is calculated from the AF result, and macro shooting is discriminated. Night view, evening view, landscape, indoor scene or the like is discriminated from the AE result, the tone color and luminance values on the screen, the AF distance information and the like. Backlight is discriminated from object luminance values (Bv values) and the on-screen histogram. On-screen color distribution and the like are acquired from the on-screen histogram result, and the main object is discriminated.

In step S206, three types of shooting parameters are determined, according to the scene analysis result. In step S207, processing for returning the shooting settings for analysis set in step S201 to the original shooting settings is performed.

FIGS. 7A to 7D are conceptual diagrams showing a shooting setting candidate being selected on a selection screen and reflected in the live view image, after the Analyze button has been pressed in step S103 of FIG. 5, in the present embodiment. The scene in FIGS. 7A to 7D represents a backlight state, and is assumed to be a shooting scene in which the background is bright and the object is slightly dark.

Figure 7A:
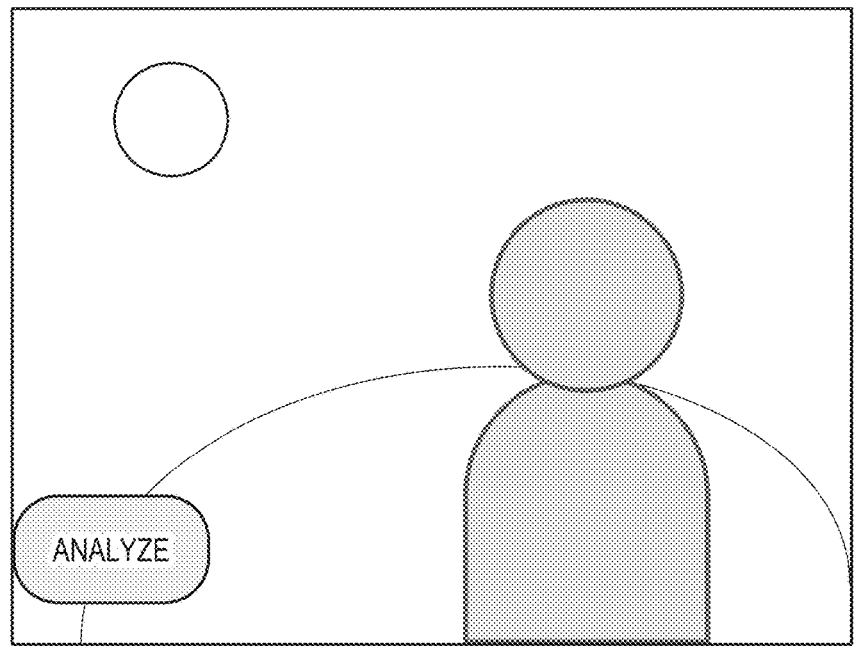
FIGS. 7A to 7D are conceptual diagrams showing a shooting procedure.
Figure 7B:
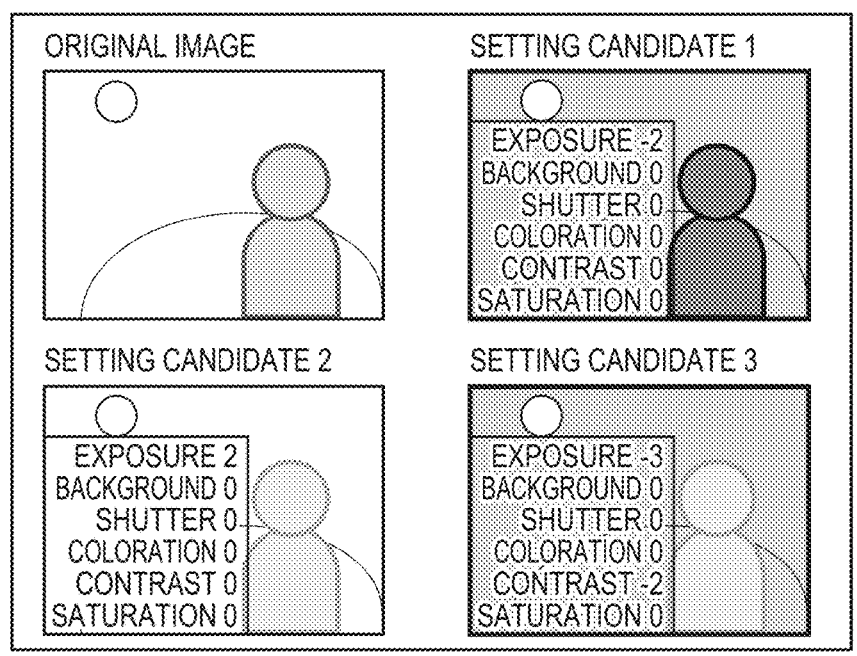

FIG. 7A shows the Analyze button being displayed at the same time while displaying the live view image. FIG. 7B shows a state in which candidates for three types of shooting settings (candidate generation) that depend on the scene and images of the image effects when those settings are configured are displayed, as a result of pressing the Analyze button in FIG. 7A. In FIG. 7B, a setting candidate 1 shows the person as being darkened as a result of reducing the exposure and setting the background to the correct exposure. A setting candidate 2 shows the person as being correctly shot and the background as being brighter, as a result of increasing the exposure. A setting candidate 3 shows the exposure of the background as being suppressed to an extent that halation does not occur, as a result of reducing the exposure one stop, and the person as being slightly brighter, as a result of lowering the contrast and lifting the dark portion of the dark region.

The image diagrams displayed here are displayed by performing image processing on the image captured when the Analyze button is pressed, so as to approach images that would be obtained with the above shooting settings. It is also possible to perform this image processing on the live view image and display the result by installing a high-speed processing circuit as hardware.

Figure 7C:
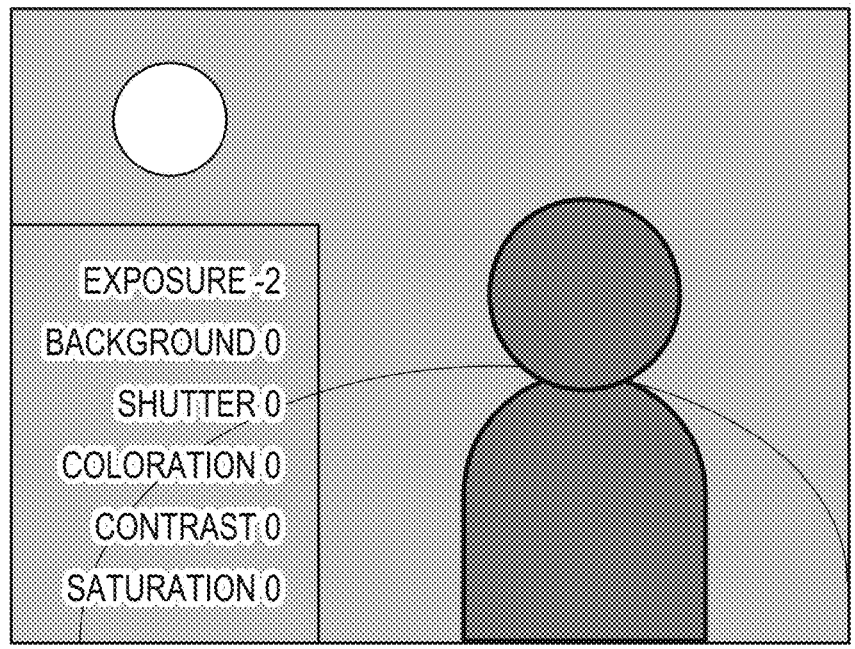
Figure 7D:
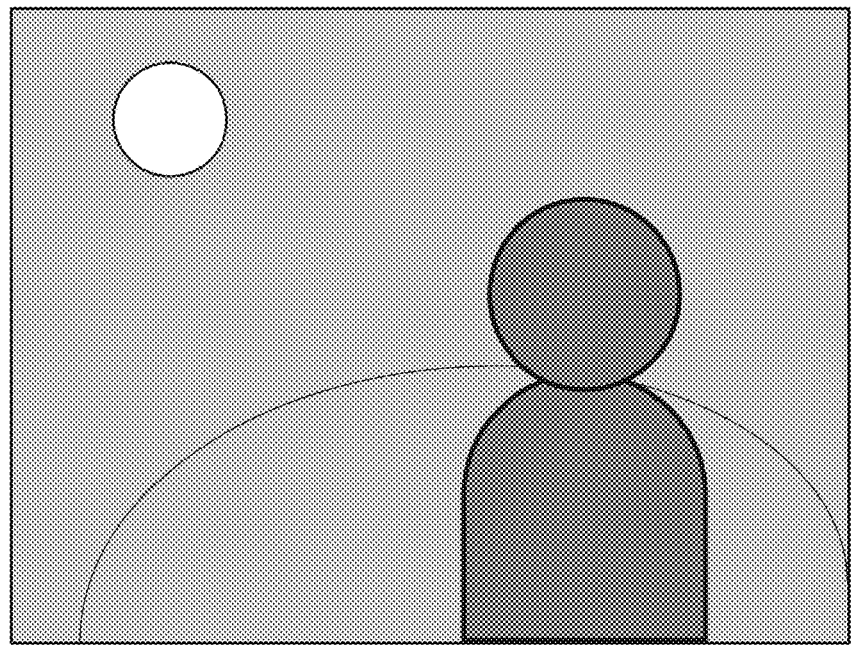

In FIG. 7B, when the setting candidate 1, for example, is selected by the user, shooting is performed with the shooting setting of the setting candidate 1, and the shot image is displayed as a live view image. The live view image referred to here is obtained by displaying an image shot after actually setting the exposure, without correction by the image processing circuit such as aforementioned. Also, as shown in FIG. 7C, the shooting setting is displayed on the monitor apparatus 110, and it is also possible for the user to further change the settings from this shooting setting. FIG. 7D shows a state in which a shooting instruction has been given in FIG. 7C and a review image after performing still image shooting is displayed.

Figure 8:
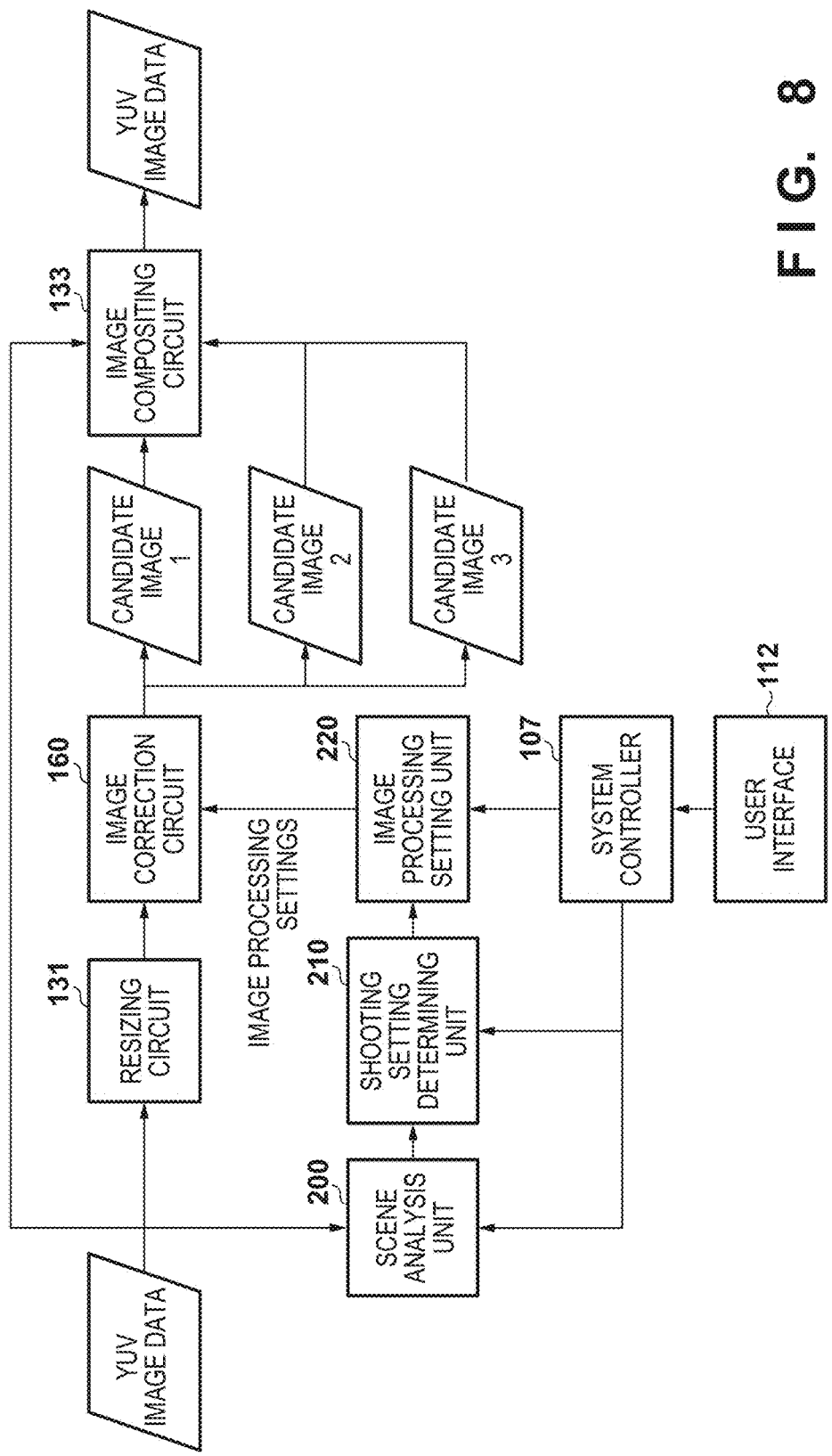
FIG. 8 is a block diagram showing processing for generating a shooting settings selection screen.

FIG. 8 is a block diagram showing the flow of operations for generating the selection screen for the three types of shooting settings in FIG. 7B. The YUV image data obtained with the image acquisition operation for scene analysis in step S204 of FIG. 6 undergoes scene discrimination by a scene analysis circuit 200 that is realized by the system controller 107. The scene analysis circuit 200 is realized by the system controller 107 performing computations, based on information that is obtained from shutter and aperture control values output to the face detection circuit 120, the histogram circuit 130, the on-screen color distribution acquisition circuit 132 and the taking lens 102 in FIG. 1, and the like. A shooting setting determining circuit 210 that is realized by the system controller 107 determines three types of shooting settings, according to scene information determined by the scene analysis circuit 200. An image processing setting circuit 220 that is realized by the system controller 107 determines the image processing parameters according to the determined shooting settings. The determined image processing parameters are image processing parameters that are used in the processing of FIG. 9 which will be discussed later.

On the other hand, the YUV image data is resized by the resizing circuit 131 to a size for displaying the influence of the parameter change, undergoes three types of image processing by the image correction circuit 160, and is composited with the original YUV image data by the image compositing circuit 133. Here, the image conversion resulting from changing the image processing parameters can be generated by the signal processing circuit 140 from a RAW image. However, as already described with FIGS. 7A to 7D, this image conversion can be generated in a pseudo manner, by performing simple image processing on the analyzed image. Since an image to which a plurality of effects have been provided can thus be generated from the same image with simple processing, there are advantages in that a screen for comparison of shooting settings and selection of shooting settings by the user can be readily displayed. Also, a RAW image does not need to be saved in order to generate this image conversion from a YUV image, enabling processing speed and memory usage to be reduced, and facilitating simplification of system control.

Figure 9:
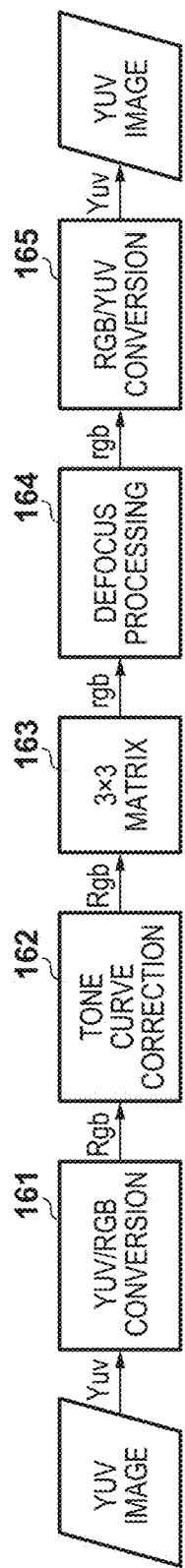
FIG. 9 is a block diagram showing image correction processing.

FIG. 9 is a block diagram showing the flow of processing in the image correction circuit 160. A YUV/RGB conversion circuit 161 converts YUV image data into RGB image data. A tone curve correction circuit 162 performs tone curve correction for each of RGB. Tone curve correction involves performing exposure correction processing, contrast correction processing, and processing for changing WB by changing the tone curve for each of RGB.

A 3×3 matrix circuit 163 is capable of color reproduction, coloration conversion and saturation correction, which involve processing for applying a 3×3 matrix to RGB signals. A defocus processing circuit 164 is capable of background defocus processing for defocusing an image peripheral part and diorama-like filter processing for controlling the defocus amount for each vertical line of the image. The defocus processing circuit 164 is also additionally capable of toy camera-like processing for lowering the peripheral brightness and cross filter-like processing for applying a cross filter to bright portions. An RGB/YUV conversion circuit 165 converts RGB image data into YUV image data.

Figure 10A:
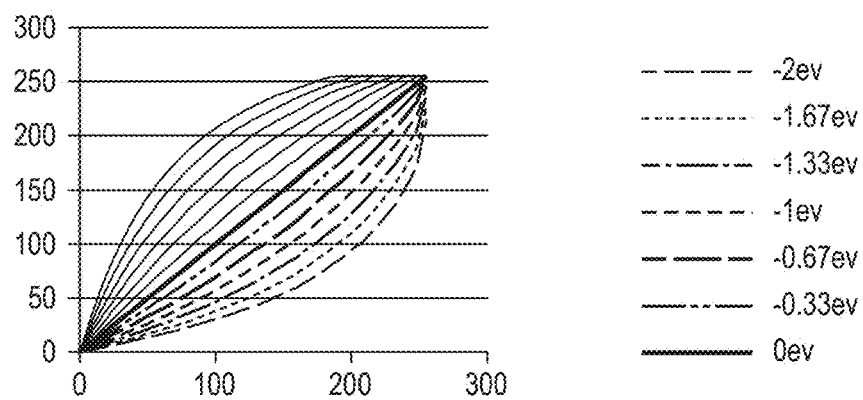
FIGS. 10A to 10C are diagrams showing exemplary image correction settings.
Figure 10B:
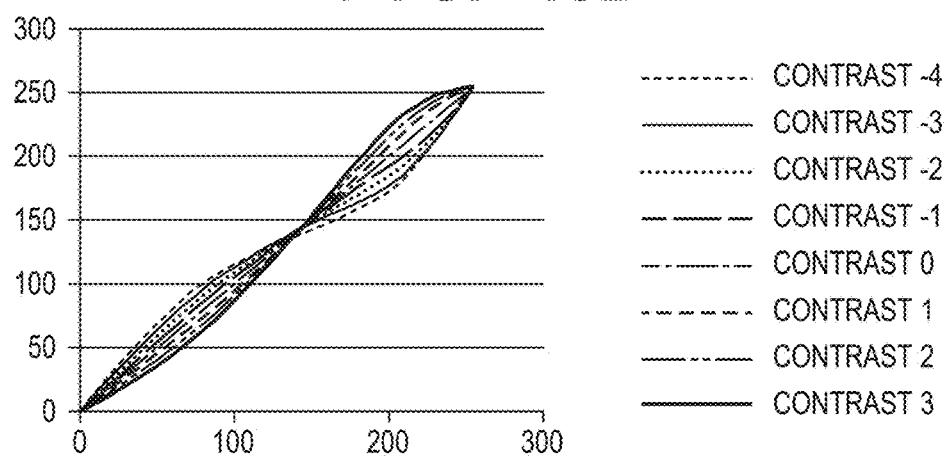
Figure 10C:
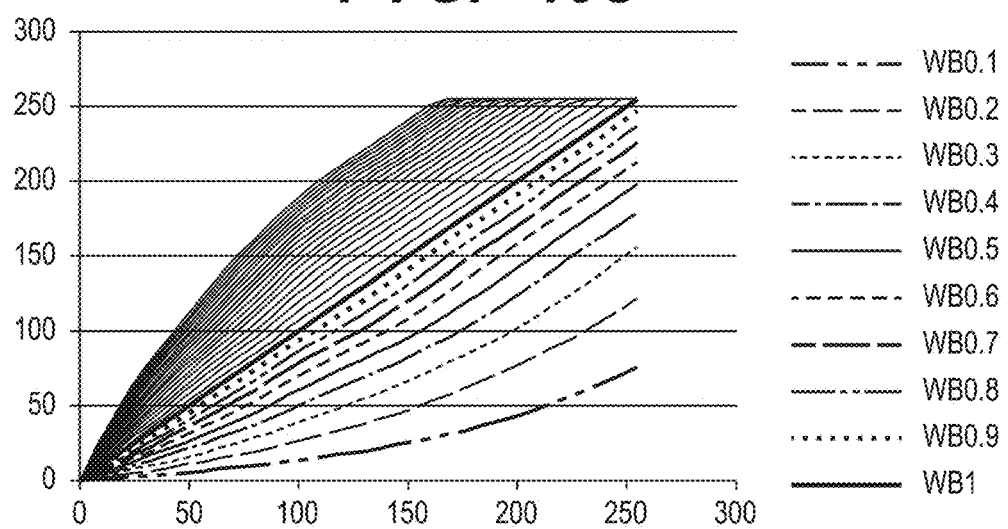

FIGS. 10A to 10C are diagrams showing an example of image correction settings configured by the image correction circuit 160 shown in FIG. 9. The image correction circuit 160 is an image processing circuit that performs pseudo generation of image effects in the case where the shooting settings are changed on YUV image data that has been developed normally. Processing for changing the shooting settings in the present embodiment includes exposure correction processing, contrast correction processing, white balance change processing, depth-of-color change processing, hue change processing and background defocus processing.

FIG. 10A is a diagram showing the characteristics of a tone curve for exposure correction. The tone curve for exposure correction is generable by the following computational equation.

$$\text{AECorrect}(x) = \gamma(\gamma^{-1}(x) \times 2^{exposure\ correction\ value})$$

Here, $\gamma(x)$ indicates a standard gradation conversion characteristic that is set by the luminance gradation conversion circuit 143 shown in FIG. 2B, where $\gamma^{-1}(x)$ indicates the inverse transform characteristic of $\gamma(x)$.

FIG. 10B is a diagram showing the characteristics of a tone curve for contrast correction.

$$\text{ContCorrect}(x) = \gamma i(\gamma 0^{-1}(x))$$

Contrast setting value i=−4 to +4 Here, $\gamma i(\ )$ indicates the gradation conversion characteristic in the case where contrast correction, which is set by the luminance gradation conversion circuit 143 shown in FIG. 2B, has been set, and the suffix i indicates the setting value. With regard to the value of i, 0 indicates the standard, the + direction indicates a conversion that strengthens contrast, and the − direction indicates a conversion that weakens contrast.

FIG. 10C is a diagram showing the characteristics of a tone curve for WB correction. In the present embodiment, the respective tone curves for RGB are calculated using a ratio of the AWB coefficient used at the time of RAW shooting and the corrected WB coefficient.

$$\text{Gain}R = \text{WB\_R\_corrected} / \text{WB\_R\_AWB}$$

$$\text{Gain}R = \text{WB\_G\_corrected} / \text{WB\_G\_AWB}$$

$$\text{Gain}R = \text{WB\_B\_corrected} / \text{WB\_B\_AWB}$$

$$\text{WBCorrect}R(x) = c\gamma(c\gamma^{-1}(x) \times \text{Gain}R)$$

$$\text{WBCorrect}G(x) = c\gamma(c\gamma^{-1}(x) \times \text{Gain}G)$$

$$\text{WBCorrect}B(x) = c\gamma(c\gamma^{-1}(x) \times \text{Gain}B)$$

Here, $c\gamma(\ )$ is a gamma curve for color and indicates the gradation characteristics that are used by the color gradation conversion circuit 145 shown in FIG. 2B. In the present embodiment, the WB coefficient ratio illustrates curves in 0.1 increments, and the gradation conversion characteristics of gains of 0.1 or less may be determined using linear interpolation.

The gradation characteristics shown in FIGS. 10A to 10C are composited in order of exposure correction, contrast correction and WB correction, and the composited tone curve characteristics are respectively set in the tone curve correction circuit 162 of FIG. 9.

Next, techniques for saturation correction and hue correction will be described. In the case of JPEG data, the following relation equation is defined with a color difference signal and an RGB conversion equation.

$$\begin{pmatrix} Y \\ R-Y \\ B-Y \end{pmatrix} = M \begin{pmatrix} R \\ G \\ B \end{pmatrix}$$

$$M = \begin{pmatrix} 0.3 & 0.59 & 0.11 \\ 0.7 & -0.59 & -0.11 \\ -0.3 & -0.59 & 0.89 \end{pmatrix}$$

The RGB signal is derived as follows from the YUV signal, using an inverse matrix.

$$\begin{pmatrix} R \\ G \\ B \end{pmatrix} = M^{-1} \begin{pmatrix} Y \\ R-Y \\ B-Y \end{pmatrix}$$

Color difference signal correction processing, which is correction processing on the YUV color difference signal, can be represented as follows when the saturation enhancement parameter is given as a.

$$\begin{pmatrix} Y \\ R-Y \\ B-Y \end{pmatrix} = K \begin{pmatrix} Y \\ R-Y \\ B-Y \end{pmatrix}$$

where $$K = \begin{pmatrix} 1 & 0 & 0 \\ 0 & \alpha & 0 \\ 0 & 0 & \alpha \end{pmatrix}$$

In other words, the saturation correction parameter can be represented with the following equation.

$$\begin{pmatrix} R' \\ G' \\ B' \end{pmatrix} = M^{-1} \cdot K \cdot M \begin{pmatrix} R \\ G \\ B \end{pmatrix}$$

Hue angle conversion can also be represented as follows when the rotation angle is given as θ.

$$\begin{pmatrix} Y \\ R-Y \\ B-Y \end{pmatrix} = P \begin{pmatrix} Y \\ R-Y \\ B-Y \end{pmatrix}$$

where $$P = \begin{pmatrix} 1 & 0 & 0 \\ 0 & \cos\theta & \sin\theta \\ 0 & -\sin\theta & \cos\theta \end{pmatrix}$$

such that $$\begin{pmatrix} R' \\ G' \\ B' \end{pmatrix} = M^{-1} \cdot P \cdot M \begin{pmatrix} R \\ G \\ B \end{pmatrix}$$

Hue angle conversion and saturation enhancement parameters can be combined and expressed as follows.

$$\begin{pmatrix} R' \\ G' \\ B' \end{pmatrix} = Q \begin{pmatrix} R \\ G \\ B \end{pmatrix}$$

where $Q = M^{-1} \cdot P \cdot K \cdot M$.

It thus becomes possible to perform color correction by setting the combined computation matrix Q in the 3×3 matrix circuit 163. It is of course possible to represent not only saturation enhancement and hue angle conversion but also the conversion equation for color reproduction of various landscapes or a portrait with a 3×3 matrix, and image conversion processing can be performed by combining this conversion equation with the aforementioned matrix Q.

FIGS. 11A and 11B are block diagrams showing the procedure of processing by the defocus processing circuit 164 shown in FIG. 9. Defocus processing is performed by a low pass filter or a Gaussian filter being applied to image data by a defocus processing circuit 166. An image that has not undergone defocus processing is multiplied by a composite mask representing the image composition ratio for each pixel, whereas with an image that has undergone defocus processing, the composition ratio of the composite mask is subtracted from 1, and both images are composited. FIG. 11B shows an example of a composite mask for creating the periphery of the image into a defocused image. These composite masks may be determined from the position of the main object by detecting the main object. Also, although a binarized composite mask is shown in this example, a configuration may be adopted in which composition processing is smoothly performed by gradually changing the composition ratio. In this case, generation is possible by applying a defocus processing filter to the composite mask.

FIG. 12 is a diagram showing an example of scene discrimination in the present embodiment. Hereinafter, the method of scene analysis in step S205 of FIG. 6 will be described. In the present embodiment, a face detection result, a motion vector, object distance, on-screen distance information, object luminance, in-plane luminance distribution, in-plane color distribution and intra-image contrast, for example, are used, in order to perform scene discrimination. Hereinafter, a method of calculating information that is used in each of the aforementioned scene discriminations will be described.

Face detection methods include methods using learning that are generally represented by neural networks, and methods of detecting a region having a characteristic physical shape such as the eyes or nose from an image region using template matching. Many other techniques such as detecting image feature amounts like skin color and eye shape and performing statistical analysis have also been proposed, and generally a plurality of these methods are used in combination. Furthermore, methods such as a face detection method utilizing wavelet transform and image feature amounts and a method that combines template matching and the like have been proposed. In any case, detection of a face from an image is implementable with many well-known methods, and thus a detailed description is omitted in the present embodiment.

Main object motion detection is performed by, for example, judging whether the position of the detected face moves a predetermined distance or more between a plurality of frames. Apart from face detection, motion may be determined using the amount of movement between frames of the point of focus determined by autofocus. Also, a technique that involves performing template matching in time series with regard to an object designated by the user in an image on the UI 112 or the monitor apparatus 110 and determining motion from the amount of movement between frames may be used. Many propositions have also been made with regard to this determination of the motion of the main object, and a detailed description is omitted.

Figure 13:
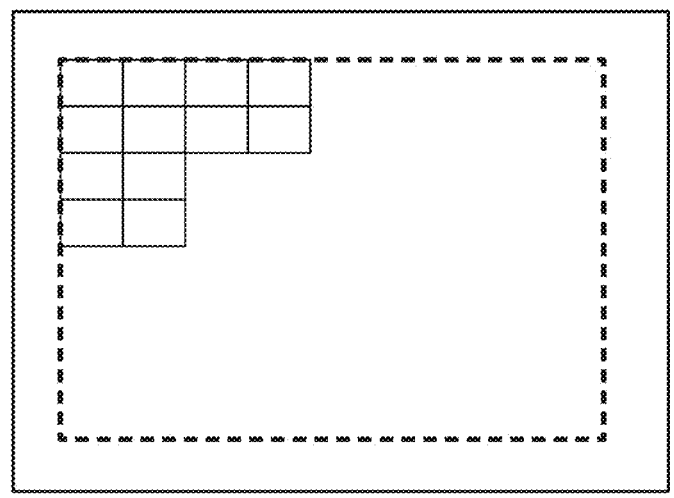
FIG. 13 is a diagram showing an image divided into blocks.

The in-plane color distribution data is obtained by the on-screen color distribution acquisition circuit 132 dividing the YUV image data that is output from the signal processing circuit 140 in FIG. 2 into a plurality of blocks, and calculating the average value of YUV for each block. FIG. 13 is a diagram showing YUV image data divided into a plurality of blocks in a plane.

Saturation S and hue H are calculated using the following equation from the YUV values for each in-plane block.

| Luminance | Y |
| Hue | $H = \tan^{-1}(V/U)$ |
| Saturation | $S = \sqrt{U^2 + V^2}$ |

The data of YHS for each block is in-plane color distribution data.

FIG. 14 is a diagram representing detection threshold values of luminance, hue and saturation of each block in block data with upper limits and lower limits of scene determination conditions. The number of blocks that are included in each threshold value is calculated, and the ratio thereof to all of the blocks on the screen is calculated. The scene discrimination level is calculated by comparing the calculated ratio with the numerical values of a screen ratio L and a screen ratio H. In the case where the calculated ratio is less than the screen ratio L, the color scene discrimination level is set to 0, in the case where the calculated ratio exceeds the screen ratio H, the color scene discrimination level is set to 100, and in the case where the calculated ratio is between the screen ratio L and the screen ratio H, the color scene discrimination level is calculated using linear interpolation. Object luminance (brightness value; hereinafter, Bv value) is calculated from brightness at the time that light metering is performed in step S203 of FIG. 6. Since there are many well-known examples regarding AE techniques, a detailed description is omitted. In the present embodiment, description will be given based on a general AE technique.

A block integrated value is acquired from the image acquired at the time of AE light metering, and a block luminance value Y[i] is calculated.

$$Y[i]=0.3*R[i]+0.3*G1[i]+0.3*G2[i]+B[i]$$

(i: block position)

The block luminance value is multiplied by a weight of the main object for each block or a center-weighted weight AE_Weight, and a luminance value Y_Ave is calculated.

$$Y\_Ave=\Sigma(AE\_Weight[i]\times Y[i])$$

An exposure level difference DeltaBv with a light metering value is calculated, such that the calculated luminance value achieves an AE target value (AE_Target).

$$DeltaBv=\log_2(Y\_Ave/AE\_Target)$$

The object luminance is calculated by adding the calculated exposure level difference to the exposure value at the time of light metering.

$$Bv=Av+Tv-Sv+DeltaBv$$

An Apex value that is used in the above exposure calculation is calculable using definitions.

$$Av:Av=\log_2 F^2 \quad F: FNo$$

$$Tv:Tv=\log_2(1/T) \quad T: \text{Shutter speed}$$

$$Sv:Sv=\log_2(S\times 0.32) \quad S: \text{ISO speed value}$$

The following equation holds at the time of correct exposure.

$$Av+Tv=Bv+Sv$$

The aperture value, shutter speed and sensitivity are calculated from the calculated object luminance value, based on a program diagram set in advance.

Light metering methods in the case of calculating correct exposure include evaluation metering, center-weighted metering, average metering, and spot metering. With methods such as evaluation light metering, exposure conditions are determined, in the case where it is detected that the main object is a face, such that the brightness of the face, for example, will be correct.

Also, a block Bv value (block luminance value) is also calculable, by calculating the luminance difference from the correct level for each block, with respect to the Bv value detected at the time of light metering. The block luminance value is represented by the following equation, where BlockY is the block integrated value or the calculated luminance value and AE_Target is the AE target value.

$$BlockBv[i] = Bv + \log_2(BlockY[i]/AE\_Target)$$

(i indicates the block position)

The object distance is calculated from the result of AF (autofocus). Autofocus methods include a contrast detection method and a phase difference detection method. Phase difference detection methods also include a method that is able to calculate the object distance throughout the entire screen, using an image sensor in which pixels that detect phase difference are disposed on an image capturing surface.

Any of the contrast detection methods and the phase difference detection methods enable the distance to the object to be calculated using the focal length of the taking lens and the aperture value, by dividing the image region into a plurality of blocks and calculating a focus position for each region. The object distance can be calculated for all the block regions on the screen, and set as on-screen distance information. In the case where the distance to the main object is calculated using any of these methods, methods for discriminating the main object include the following. For example, a face region on the screen is determined to be the main object. Alternatively, a close-range object near the screen center, an object of a different color to the periphery, an object set by the user using the screen of the monitor apparatus 110 or the like is determined to be the main object. The main object can be discriminated using these methods, and the distance thereto can be detected.

An intra-image contrast value is calculated from the histogram result that is calculated by the histogram circuit 130. The difference in luminance value between the top 10% and the bottom 10% of luminance values of the histogram or a standard deviation value that is calculated from the histogram can be set as a contrast value.

Techniques for determining the camera state include a method using an angular velocity sensor. It can be determined, from the output of the angular velocity sensor, that the camera is mounted on a tripod in the case where the camera is stationary, is in a panning state in the case where the camera is moving in a constant direction, and is in a hand-held shooting state in the case where the camera is moving discontinuously. Many of the latest digital cameras now have a camera-shake correction mechanism that uses an angular velocity sensor such as a gyroscope sensor, and such sensors can be appropriated in determining the camera state.

Hereinafter, the scene discrimination method shown in FIG. 12 will be described.

Portrait Determination

In portrait determination, it is determined, from the detection result of the face detection circuit 120 in FIG. 1, that the scene is a portrait scene, in the case where the face is greater than or equal to a given size in proximity to the center of the screen and where the number of faces is two or less. More specifically, it is determined to be a portrait scene, in the case where the value of the portrait level is calculated based on the position of the face, the size of the face, the face detection reliability, the number of persons and the like and is greater than or equal to a predetermined value.

Portrait level=face position weight×face size weight× face reliability×number-of-persons weight Face position weight: center→100%, 80% or more of image height→0%
Face size weight: 20% or more of angle of view→100%, 5% or less of angle of view→0%
Degree of face reliability: 0%-100%
Number-of-people weight: 1→100%, 2→50%, 3→30%, 4 or more→0%

Here, in the case of determining the face position weight, importance is calculated, with respect to each of a plurality of detected faces, for example, from the center position and size of the face, and the face position weights are determined, with the face having the highest face importance as the main face and the other faces as secondary faces.

The main object motion detection can be performed by calculating the aforementioned object motion amount. Also, acquisition of the image data of the plurality of frames that are used by the technique using image correlation may be performed by acquiring a plurality of frames after the Analyze button is pressed in step S103 of FIG. 5. Alternatively, an image may be acquired beforehand during live image display, and scene discrimination may be performed depending on the determination performed at the time that the Analyze button is pressed.

Object Motion Determination

In the case where there is motion greater than or equal to a predetermined value, according to the motion amount of the main object, that object may be determined as the motion object. Also, it is possible to calculate the optimal shutter speed without producing object blur, from the relationship between the motion amount and the data acquisition time period between frames.

Landscape Determination

Landscape determination is performed using the object luminance obtained by performing light metering in step S203 of FIG. 6, and the data of the on-screen color distribution acquisition circuit 132. As the determination conditions, the object luminance being greater than or equal to a predetermined value and the number of green blocks and blue blocks obtained by in-plane tone color determination, for example, are used.

Macro Determination

Macro determination is performed using the distance of the main object that is calculated from AF. In the case where the object distance is less than a predetermined ratio with respect to the focal length of the taking lens 102, such as the object distance being less than 20 times the focal length, for example, it is determined to be macro shooting. In the case of a distance greater than or equal thereto, the macro discrimination level is calculated according to the distance information, with the macro determination level set to 0 in the case where the object distance is up to 40 times the focal length, for example. The multiplying factor of the focal length may be changed according to the aperture value of the taking lens 102.

Dynamic Range Determination

Dynamic range is calculated with respect to the shooting scene. In the present embodiment, the number of pixels greater than or equal to a predetermined luminance is counted from contrast data, and it is judged that the dynamic range on the bright side is insufficient in the case where the counted number is greater than or equal to a predetermined number. Conversely, it is judged that the dynamic range on the dark side is insufficient, in the case where the number of pixels less than or equal to a predetermined luminance value is counted and the counted number is greater than or equal to a predetermined number. Also, the deficient amount of the dynamic range on the over side and the under side may be estimated, according to the counted number of pixels.

Backlight Determination

In backlight determination, the difference between the average value of block Bv values for a center portion in the image or the main object detection portion and the average value of block Bv values for an image peripheral portion is calculated, and it is judged to be backlit in the case where the background is brighter by greater than or equal to a predetermined amount. Also, in the case of determining the backlight level, the determination can be performed with, for example, the backlight level set to 0% in the case where the above difference is less than 2 stops and the backlight level set to 100% in the case where the above difference is greater than or equal to 4 stops.

Brightness (Outdoors/Indoors) Determination

Figures 15, 16A:
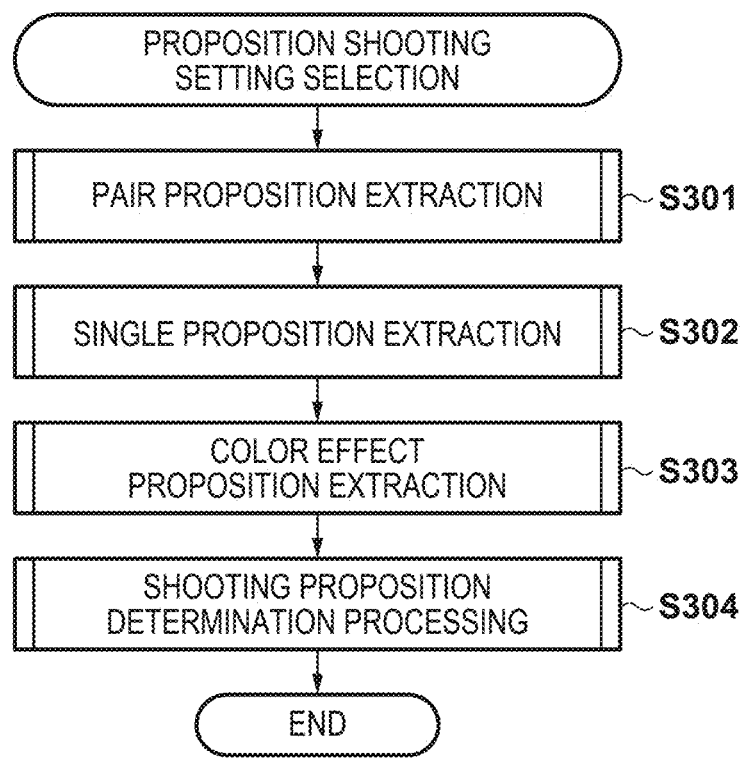
FIG. 15 is a diagram showing conditions for brightness determination.
FIG. 16A is a flowchart showing shooting setting proposition processing.

Brightness determination is performed using object luminance. In the case where the object luminance is greater than or equal to a predetermined value, such as $Bv \geq 5$, for example, it can be determined to be outdoors, and in the case where $Bv < 5$, it can be determined to be indoors. Apart from object luminance, in the case where there are many green and blue objects when the in-plane color distribution is viewed, it may be determined to increase the level of the outdoor determination. For example, the outdoors level is set to 100% at or above the Bv upper limit and is set to 0% at or below the Bv lower limit according to the number of blue and green blocks, as shown in FIG. 15, and in the case of an intermediate Bv, linear interpolation is performed and the outdoors level is calculated.

Blue Sky Determination

Blue sky determination is performed using Bv values and in-plane color information. For example, it is determined to be blue sky in the case of satisfying either of the following conditions:

Condition 1: $Bv \geq 7$, blue block $\geq 40\%$
Condition 2: $Bv \geq 5$, blue block $\geq 20\%$, white block 30%

Also, the blue sky level is calculated by the ratio of the number of blocks that are detected with condition 1 and condition 2.

Night View Determination

In night view determination, it is determined to be a night view in the case where the Bv value is less than or equal to 0, and the contrast value of the histogram is greater than or equal to a predetermined value. The night view level is calculated such that the value increases as the Bv value decreases and the contrast value increases.

Evening View Determination

Evening view determination is performed using Bv values and in-plane color information. It is determined to be an evening view, in the case of satisfying either of the following conditions:

Condition 1: $2 \leq Bv \leq 5$, orange block $\geq 40\%$, blue block $\geq 20\%$, contrast value $\geq 30$
Condition 2: $5 \leq Bv \leq 10$, orange block $\geq 20\%$, blue block $\geq 40\%$, contrast value $\geq 30$ It is also possible to calculate the evening view level according to the number of orange blocks.

Spotlight Determination

In spotlight determination, the difference between the average value of block Bv values of an image center portion or the main object detection portion and the average value of block Bv values of an image peripheral portion is calculated, and in the case where the peripheral luminance value is lower by 4 stops or more, for example, it is determined to be a spotlight. Also, the spotlight level may be calculated according to the size of this difference.

Background Distance

Calculation of the background distance is performed using the on-screen distance map which has already been described. A histogram of object distances for each block may be generated, and the distance of the region having the highest appearance frequency may be set as the background object distance, out of the regions that are separated by at a depth of 5 or more by depth conversion, for example, with respect to the main object distance. Alternatively, a region that is furthest away, out of blocks of a predetermined number or more, may be set as the background distance. Setting blocks of a region within a predetermined distance from the background distance as the background region enables the main object region and the background region to be set and the object distance to be calculated.

Color Scene Determination

In color scene determination, the color scene discrimination level of yellow, blue, red and green are calculated. The in-plane block number that satisfies a predetermined condition from the hue and saturation calculated from the aforementioned block integrated values is extracted, and the color scene discrimination level is calculated based on this number.

Next, the method of determining the shooting parameters in step S206 of FIG. 6 will be described. The description in this embodiment is premised on three types of shooting parameters being presented according to the scene analysis result. FIG. 16A is a flowchart showing the flow of operations from scene discrimination to determination of shooting proposition contents.

In FIG. 16A, processing for extracting pair proposition contents is performed in step S301. Pair proposition refers to presenting two types of shooting settings that are contrasted. By presenting two types of shooting settings that are contrasted, the difference in shooting settings can be emphasized, and the user can be made aware of the difference in effect between the shooting settings.

Figure 16B:
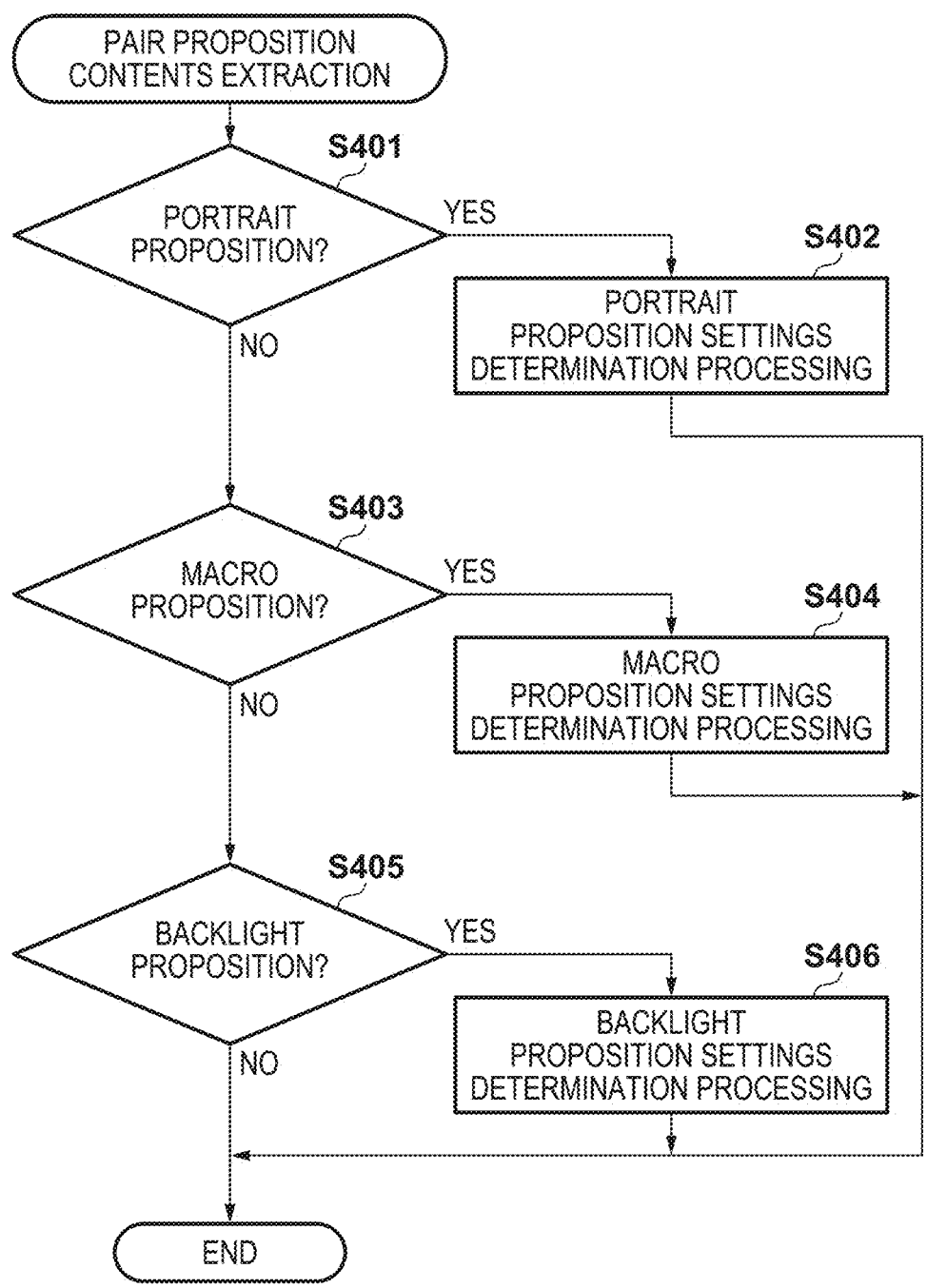
FIG. 16B is a flowchart showing shooting setting proposition processing.

FIG. 16B is a flowchart showing the flow of operations for selecting a pair proposition setting. In step S401, portrait scene determination is performed. With a portrait scene, two types of shooting settings in which the parameters are separated by greater than or equal to a threshold value, namely, a shooting setting for performing shooting that defocuses the background by reducing the depth of field and a shooting setting for crisply capturing the background by increasing the depth of field, can be proposed.

The depth difference effect fitness is calculated, according to the portrait level of the face detection result and the depth difference between the main object and the background object that is obtained from the difference between the main object distance and the background object distance. It is judged to perform portrait proposition in the case where both the face detection result and the depth difference fitness are greater than or equal to a predetermined value. In the case where it is judged at step S401 to perform portrait proposition, a setting in which the aperture value is set to F2.8 and a setting in which the aperture value is set to F11.0 are both proposed as a pair in step S402.

In step S403, it is determined whether it is possible to propose macro shooting. In macro shooting, a shooting method that defocuses the background and a shooting method that also does not defocus the background can be proposed. In macro proposition determination, the macro determination result and the depth difference between the main object distance and background distance are calculated, and the depth difference fitness is calculated. It is judged that macro proposition is possible in the case where the macro determination result and the depth difference fitness are greater than or equal to a predetermined value. In the case where it is judged at step S403 that macro proposition is possible, a setting in which the aperture value is set to F2.8 and a setting in which the aperture value is set to F11.0 are both proposed as a pair in step S404.

In step S405, backlight shooting fitting scene determination is performed. With a backlight scene, a method of shooting with the brightness of the main object set to a predetermined brightness and a method of shooting with the main object set to be in silhouette style can be proposed. Backlight proposition is performed based on backlight determination which has already been described. In the case where it is judged at step S405 that backlight proposition is possible, in step S406, DeltaBv is derived with respect to each of the blocks of the main object region and the background region, and an exposure setting value is determined. An exposure correction setting value is calculated from the calculated exposure setting value.

Next, single proposition extraction is performed in step S302 of FIG. 16A. Single proposition is processing for determining fitness and shooting settings suitable for the scene, based on analyzed scene information.

FIG. 16C is a flowchart showing the flow of the single proposition in step S302 of FIG. 16A. In FIG. 16C, in step S501, the scene discrimination level of the portrait scene is determined, and, in the case where the discrimination level is greater than or equal to a predetermined threshold value, shooting settings for portrait shooting are determined. The portrait scene discrimination level is calculated based on the aforementioned equation.

In the case where the portrait discrimination level is greater than or equal to a predetermined threshold value, the aperture value is set on the open side, the exposure setting is set to +3 such that the color of the face is brightened, the contrast setting is set to −3 such that gradation is smooth, and the finishing setting is set to portrait, according to the portrait discrimination level.

In step S502, the landscape scene discrimination level is calculated, and, in the case where the landscape scene discrimination level is greater than or equal to a predetermined threshold value, the landscape shooting settings are determined. In landscape scene discrimination, it is determined to be a landscape scene in the case where the brightness determination result is bright, the object distance is greater than or equal to a predetermined distance, the sum of the color blocks of FIG. 14 other than white, black, gray and skin color is greater than or equal to a predetermined rate, such as occupying 30%, for example. In the case where it is determined to be a landscape scene, the shooting settings are set to landscape, saturation and contrast are set to +3, and the exposure value is set to −1.

In step S503, the evening view level scene discriminability is calculated, and, in the case where the evening view level scene discriminability is greater than or equal to a predetermined threshold value, it is determined to be an evening view shooting setting. In evening view scene discrimination, the determination result of the aforementioned evening view determination is used. In the case where it is determined to be an evening view, the exposure is set to −2, the saturation setting is set to +2, and the coloration is set to shady.

In step S504, the night view level scene discriminability is calculated, and, in the case where the night view level scene discrimination is greater than or equal to a predetermined threshold value, it is determined to be a night view shooting setting. In night view scene determination, the night view determination result is used. In the case where it is determined to be a night view, if a face is not detected, exposure is set to −2 and contrast is set to +2. If a face is detected, exposure is set to −1 and contrast is set to +1. In the case where a face is detected, the settings are configured to avoid overdoing shadow line enhancement (kuroshime), which tends to result in the face becoming washed out, and in the case where a face is not detected, the settings are configured to increase shadow line enhancement and create a striking image.

In step S505, high key shooting setting determination processing is performed. In high key shooting determination, high key shooting is set in the case where brightness is determined to be high and the number of the color blocks that are determined to be white is greater than or equal to a predetermined percentage within the screen. Specifically, it is determined to be high key shooting in the case where the following conditions are satisfied:
Condition 1: white blocks≥10%
Condition 2: determined to be bright
Condition 3: black blocks≤10%, white blocks≤60%
The high key discrimination level is determined using the percentage of white block. The high key level is determined to be 30% at 10% white blocks, and to be 70% at 30% white blocks. In the case where it is determined to be high key, the exposure setting is set to +6, saturation is set to −3, and contrast is set to −2.

In step S506, low key shooting setting determination processing is performed. In low key shooting determination, low key shooting is set in the case where the shooting scene has a contrast greater than or equal to a predetermined value and a halftone gradation, and the number of black blocks and white blocks is greater than or equal to a predetermined value. Specifically, it is determined to be low key shooting in the case where the following conditions are satisfied.
Condition 1: 10%≤white block≤30%
Condition 2: 10%≤black block≤30%
Condition 3: contrast (luminance standard deviation of image)≥50
The low key discrimination level is set to 50% in the case of satisfying the above determination. In the case where it is not determined to be low key, the exposure setting is set to −6, saturation is set to +3, and contrast is set to +2.

In step S507, monochrome shooting setting determination processing is performed. In monochrome shooting determination, monochrome shooting is set in the case where the shooting scene has a contrast greater than or equal to a predetermined value and the number of halftone gradation blocks and white blocks is greater than or equal to a predetermined value. Specifically, it is determined to be monochrome shooting in the case where the following conditions are satisfied.
Condition 1: 10%≤white block≤30%
Condition 2: Blocks other than white blocks and black blocks occupy 50% of screen.
Condition 3: Contrast (luminance standard deviation of image)≥50. The monochrome discrimination level is set to 40%, in the case of satisfying the above determination.

In the case where it is determined to be monochrome, and a face has not been detected or the size of the face is less than or equal to a predetermined size, it is determined to configure the following settings based on the color block rate. The number of red blocks, the number of blue blocks, and the total number of yellow blocks and skin color blocks are calculated, and pink is set if the red blocks are the most numerous, purple is set if blue blocks are numerous, sepia is set if the yellow/skin color blocks are numerous, and black and white is set in all other cases. In the case where the size of the face is greater than or equal to a given size, black and white is set, and contrast and exposure correction are respectively set to 4 and −2.

Next, in step S303 of FIG. 16A, color effect proposition extraction is performed. Color effect proposition involves determining color effect settings and shooting settings suitable for a scene, based on analyzed scene information.

Figure 16D:
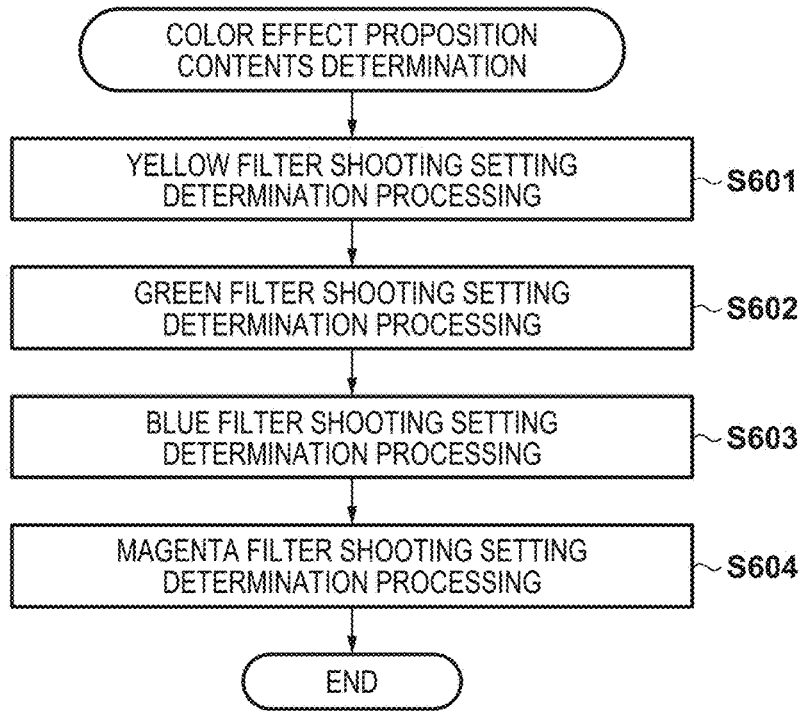
FIG. 16D is a flowchart showing shooting setting proposition processing.

FIG. 16D is a flowchart showing the flow of operations for determining the contents of color effect proposition. Steps S601 to S604 show filter determination processing of the respective color, and description will be given using a representative example, since the processing contents for each color are the same, and only the parameters differ.

FIGS. 17A and 17B are diagrams showing color detection settings, and scene discrimination levels and shooting settings in the case where the respective colors are detected. In the present embodiment, settings for yellow and blue will be described, and since the other colors can be similarly set, description thereof is omitted in the present embodiment.

In step S601 of FIG. 16D, shooting setting determination processing for yellow color effect settings is performed. In determination of yellow color effect settings, as shown in FIG. 17A, in the case where Bv is 6 or more and the percentage of yellow blocks occupying the screen is 40% or more, it is determined to be a yellow color effect fitting scene, and the scene discrimination level is determined at 50%. In terms of settings, exposure is set to +3, the coloration setting is set to shady, and coloration correction (A−B) is set to +7. Since yellow objects often have high reflectance and exposure is often controlled to underexpose, the yellowish tinge over the entire screen is enhanced by setting exposure on the high side and setting WB to a high color temperature. When shooting settings are configured in this way, the overall color tends to be on the amber side, and a warm twilight image can be represented.

Similarly, in the case where Bv is 6 or more and yellow blocks occupy 20% or more, the scene discrimination level is determined at 40%. In terms of settings, exposure is set to +3, contrast is set to +3, saturation is set to +2, the coloration setting is set to sunny, and coloration correction (A−B) is set to +9. By configuring the settings in this way, an image imbued with amber and wrapped in morning light can be shot.

In the case where Bv is 6 or more, yellow blocks occupy 10% or more and less than 20%, and it is determined to be macro, the scene discrimination level is determined as 30%. With the settings in this case, exposure is set to −2, saturation is set to −2, the coloration setting is set to shady, coloration correction (A−B) is set to +7, coloration correction (G−Mg) is set to +4. By configuring the settings in this way, an image with a slightly dark and retro feel while exuding warmth with amber can be shot.

Similarly, shooting setting determination processing for green color effect is performed in step S602, shooting setting determination processing for blue color effect setting is performed in step S603, and shooting setting determination processing for magenta color effect is performed in step S604.

Note that FIG. 18 is a diagram showing the relationship between classification of discriminated scenes and proposition type. As has already been described above, a shooting effect is proposed by performing processing such as shown in FIG. 18 on the image, according to the scene classification, and showing the effect thereof to the user.

Figure 16E:
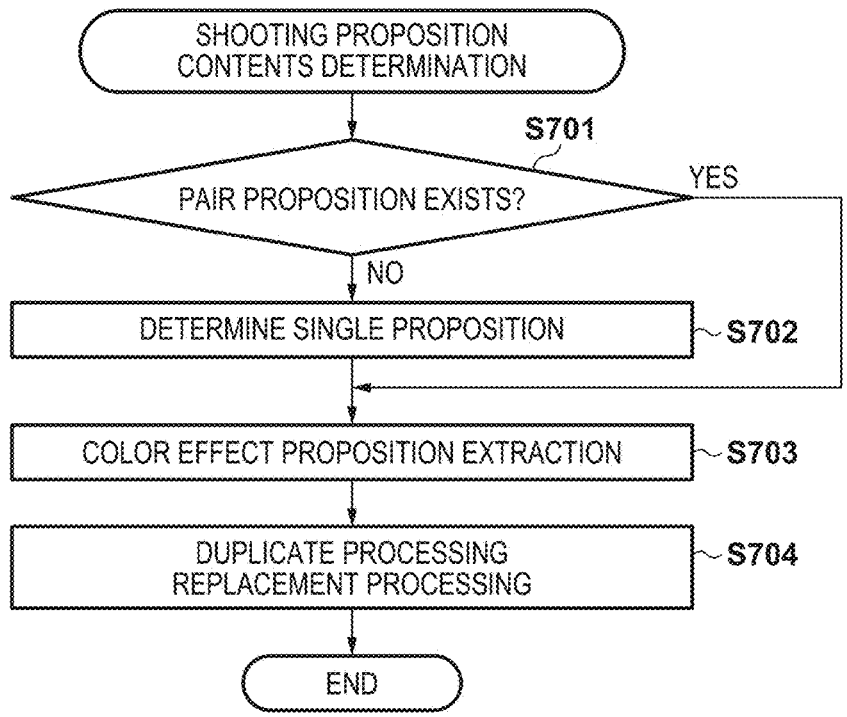
FIG. 16E is a flowchart showing shooting setting proposition processing.

Next, in step S304 of FIG. 16A, shooting proposition determination processing is performed. FIG. 16E is a flowchart showing detailed operations of the shooting proposition determination processing of step S304.

In FIG. 16E, it is checked in step S701 whether there is a pair proposition. If there is a pair proposition, the pair proposition is preferentially employed. If a pair proposition does not exist, the processing proceeds to step S702, and the scene proposition contents determined to fit the scene as a result of the scene determination, among the single propositions, are employed. In the case where there are three or more scene fitting results, the highest two types of scene discrimination levels are employed. In step S703, a color effect fitting scene is extracted. The remaining proposition contents other than the pair proposition of step S701 and the propositions of step S702 are employed as proposition contents of a number selectable from those in descending order of scene fitness.

In the case where the required number of the proposition contents is not obtained in the above proposition processing, the required number of propositions are selected at random from among high key, low key, monochrome, and color effect propositions. Also, the proposition effects that are employed in the above propositions are not subject to random selection. In the case where monochrome/color effect propositions have already been similarly proposed, the color effect propositions for monochrome and similar colors is excluded from candidates of random extraction.

Furthermore, when three shooting settings are determined, the degree of similarity of the candidates is calculated. A difference value is calculated by acquiring the difference for each shooting setting and multiplying the acquired difference by a weight for each item. As the weights of the items, the weights of the brightness setting, the background bokeh setting, the finishing setting and the coloration setting, which are settings that greatly affect the image, are increased, and the weights of object blur, coloration correction (A−B), coloration correction (G−Mg), crispness and vividness are reduced. The differences of these shooting settings are multiplied by weights, and in the case where the resultant value is not greater than or equal to a predetermined difference, low priority shooting setting candidates are deleted and new shooting settings are extracted in the aforementioned shooting setting extraction flow.

As aforementioned, shooting settings are determined by scene fitness, and image candidates are displayed according to scene fitness. Specifically, in the example of the screen in FIG. 6B, the candidates are arranged in setting candidates 1, 2, and 3 in descending order of scene fitness. Also, in the case where a pair proposition is made, images of the pair proposition are arranged in candidate 1 and candidate 2. In the case where setting of a single proposition is selected, single propositions and color effect propositions having high scene fitness are arranged. Randomly selected candidates are arranged as low order candidates. By performing arrangement in this way, the user can be more effectively made aware of the shooting candidates.

Note that, although not described in the present embodiment, a shutter speed may be proposed after performing motion determination. In the case where it is determined that panning is being performed or in the case where a region that is constantly carrying out the same motion, an optimal shutter speed that does not causes object blur to occur is calculated, from the motion amount between frames and the frame interval, and pair proposition of the optimal shutter speed and a slower shutter speed is performed. Also, in the case where motion of an object is detected, shutter speed proposition that does not cause object blur to occur may be performed.

Also, in the case where the depth difference between the main object and the background object is small and it is determined that the amount of background blur is small, bokeh can be increased by dividing the main object region and the background region, defocusing the background region by image processing based on distance information, and compositing the processed background region with the main object region. Similarly, in the case where it is determined that the main object exists near the center of the screen, toy camera-like processing that greatly reduces the peripheral brightness may be adapted. Also, in the case where it is determined to be landscape shooting, processing such as applying a diorama-like filter that performs defocus processing that leaves a portion of the lower screen and strongly defocuses regions separated from that portion.

Note that it is also possible to perform similar processing to the present embodiment at the time of editing a RAW image or a YUV image obtained in the actual shooting. The image obtained in the actual shooting is read out from memory and undergoes scene analysis, and a plurality of settings that depend on the analyzed scene are selected. It is sufficient to generate a plurality of images to which processing that depends on each of the plurality of selected settings has been applied, and to display these images together with the images read out from memory. Since this is, however, not processing at the time of shooting, shutter speed or aperture cannot be set. In view of this, it is sufficient to apply digital gain and background defocus processing, instead of setting shutter speed and aperture. Also, it is sufficient to embed the object distance in metadata together with the image at the time of actual shooting.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-129132, filed Jun. 29, 2016, which is hereby incorporated by reference herein in its entirety.

What is claimed is:

1. An image capturing apparatus comprising:
   at least one non-transitory memory device;
   at least one processor;
   a camera device that includes a taking lens and an image sensor and captures a first image, based on a first shooting setting;
   a scene discrimination unit that discriminates a scene of an object, based on the first shooting setting and a feature amount of the first image;
   a candidate generation unit that generates a shooting setting candidate, based on a result of the discrimination by the scene discrimination unit;
   an image generation unit that generates, based on the shooting setting candidate generated by the candidate generation unit, an image reflecting an effect obtained by the shooting setting candidate; and
   a display control unit that causes a display device to display the image generated by the image generation unit,
   wherein the candidate generation unit performs at least one of a first operation for generating a plurality of shooting setting candidates in which a predetermined parameter is separated by greater than or equal to a threshold value out of the shooting settings based on a result of the discrimination by the scene discrimination unit and a second operation for generating at least one shooting setting candidate based on the result of the discrimination by the scene discrimination unit, and
   the display control unit causes the display device to preferentially display the shooting setting candidates generated by the first operation, and
   wherein the scene discrimination unit, the candidate generation unit, the image generation unit and the display control unit are implemented by the at least one processor executing at least one program recorded on the at least one non-transitory memory device.

2. The image capturing apparatus according to claim 1, further comprising a selection member for a user to select one image from the plurality of images displayed by the display device.

3. The image capturing apparatus according to claim 2, further comprising a control unit that causes the camera device to perform shooting using shooting settings corresponding to the image selected by the selection member,
   wherein the control unit is implemented by the at least one processor executing at least one program recorded on the at least one non-transitory memory device.

4. The image capturing apparatus according to claim 1, wherein the image generation unit generates images reflecting effects obtained by the shooting setting candidates, by performing image processing on the first image.

5. The image capturing apparatus according to claim 1, wherein the candidate generation unit generates two shooting setting candidates by the first operation and at least one shooting setting candidate by the second operation, and the display control unit causes the display device to display the plurality of shooting setting candidates generated by the first operation and the second operation, in a case where the shooting setting candidates are generated by the first operation, and causes the display device to display the shooting setting candidate generated by the second operation, in a case where the shooting setting candidates are not generated by the first operation.

6. The image capturing apparatus according to claim 5, further comprising a determination unit that determines a degree of similarity with regard to the shooting setting candidates generated with the first operation and the shooting setting candidate generated with the second operation, wherein the display control unit causes the display device to display the shooting setting candidates that are not determined to have a high degree of similarity by the determination unit, and wherein the determination unit is implemented by the at least one processor executing at least one program recorded on the at least one non-transitory memory device.

7. The image capturing apparatus according to claim 1, wherein the candidate generation unit generates shooting setting candidates having different aperture values or exposures, in a case where any of portrait shooting, backlight shooting and macro shooting is discriminated by the scene discrimination unit.

8. The image capturing apparatus according to claim 7, wherein, in the first operation, the candidate generation unit generates a shooting setting candidate with which an aperture is open and a shooting setting candidate with which the aperture is closed by more than a predetermined value, in the case where portrait shooting is discriminated by the scene discrimination unit.

9. The image capturing apparatus according to claim 7, wherein the candidate generation unit generates a shooting setting candidate with which a main object is correctly exposed and a shooting setting candidate with which a background is correctly exposed, in the case where backlight shooting is discriminated by the scene discrimination unit.

10. The image capturing apparatus according to claim 7, wherein the candidate generation unit generates a shooting setting candidate with which an aperture is open and a shooting setting candidate with which the aperture is closed by more than a predetermined value, in the case where macro shooting is discriminated by the scene discrimination unit.

11. The image capturing apparatus according to claim 1, wherein the candidate generation unit generates the shooting setting candidate by the second operation, in the case where any of landscape shooting, evening view shooting, night view shooting, high key shooting, low key shooting and monochrome shooting is discriminated by the scene discrimination unit.

12. The image capturing apparatus according to claim 1, wherein the candidate generation unit generates the shooting setting candidate based on an in-plane color distribution, in the second operation.

13. The image capturing apparatus according to claim 12, wherein the candidate generation unit generates the shooting setting candidate based on green, yellow, blue and magenta color distributions, in the second operation.

14. An image processing apparatus comprising:
at least one non-transitory memory device;
at least one processor;
a scene discrimination unit that discriminates a scene of an object, based on a feature amount of a first image;
a candidate generation unit that generates a setting candidate relating to at least one of a shooting parameter and an image processing parameter, based on a result of the discrimination by the scene discrimination unit;
an image generation unit that generates, based on the setting candidate generated by the candidate generation unit, an image reflecting an effect obtained by the setting candidate; and
a display control unit that causes a display device to display the image generated by the image generation unit,
wherein the candidate generation unit performs at least one of a first operation for generating a plurality of setting candidates in which a predetermined parameter is separated by greater than or equal to a threshold value out of the settings based on a result of the discrimination by the scene discrimination unit and a second operation for generating at least one setting candidate based on the result of the discrimination by the scene discrimination unit, and
the display control unit causes the display device to preferentially display the setting candidates generated by the first operation, and
wherein the scene discrimination unit, the candidate generation unit, the image generation unit and the display control unit are implemented by the at least one processor executing at least one program recorded on the at least one non-transitory.

15. The image processing apparatus according to claim 14, further comprising a selection member for a user to select one image from the plurality of images displayed by the display device.

16. The image processing apparatus according to claim 15, further comprising a control unit that causes the camera device to perform shooting using settings corresponding to the image selected by the selection member,
wherein the control unit is implemented by the at least one processor executing at least one program recorded on the at least one non-transitory memory device.

17. The image processing apparatus according to claim 14, wherein the image generation unit generates images reflecting effects obtained by the setting candidates, by performing image processing on the first image.

18. A method of controlling an image capturing apparatus that includes an image capturing unit that captures a first image based on a first shooting setting, the method comprising:
discriminating a scene of an object, based on the first shooting setting and a feature amount of the first image;
generating a shooting setting candidate, based on a result of the discrimination in the scene discrimination;
generating, based on the shooting setting candidate generated in the candidate generation, an image reflecting an effect obtained by the shooting setting candidate; and
displaying the image generated in the image generation,
wherein, in the candidate generation, at least one of a first operation for generating a plurality of shooting setting candidates in which a predetermined parameter is separated by greater than or equal to a threshold value out of the shooting settings based on a result of the discrimination in the scene discrimination and a second operation for generating at least one shooting setting candidate based on the result of the discrimination in the scene discrimination is performed, and in the display, the shooting setting candidates generated by the first operation are preferentially displayed.

19. A control method for an image processing apparatus, the method comprising:

discriminating a scene of an object, based on a feature amount of a first image;

generating a setting candidate relating to at least one of a shooting parameter and an image processing parameter, based on a result of the discrimination in the scene discrimination;

generating, based on the setting candidate generated in the candidate generation, an image reflecting an effect obtained by the setting candidate; and displaying the image generated in the image generation, wherein, in the candidate generation, at least one of a first operation for generating a plurality of setting candidates in which a predetermined parameter is separated by greater than or equal to a threshold value out of the settings based on a result of the discrimination in the scene discrimination and a second operation for generating at least one setting candidate based on the result of the discrimination in the scene discrimination is performed, and in the display, the setting candidates generated by the first operation is preferentially displayed.

* * * * *